US012563297B2

(12) United States Patent
Yang et al.

(10) Patent No.: US 12,563,297 B2
(45) Date of Patent: Feb. 24, 2026

(54) MOTOR, CAMERA MODULE, AND ELECTRONIC DEVICE

(71) Applicant: GUANGDONG OPPO MOBILE TELECOMMUNICATIONS CORP., LTD., Guangdong (CN)

(72) Inventors: Song Yang, Guangdong (CN); Weicheng Wang, Guangdong (CN); Yu Fan, Guangdong (CN); Jia Qin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 176 days.

(21) Appl. No.: 18/430,967

(22) Filed: Feb. 2, 2024

(65) Prior Publication Data

US 2024/0171862 A1 May 23, 2024

Related U.S. Application Data

(63) Continuation of application No. PCT/CN2022/107514, filed on Jul. 22, 2022.

(30) Foreign Application Priority Data

Aug. 3, 2021 (CN) .......................... 202110886199.2
Aug. 3, 2021 (CN) .......................... 202110886570.5

(51) Int. Cl.
*H04N 23/68* (2023.01)
*G02B 27/64* (2006.01)
(Continued)

(52) U.S. Cl.
CPC ......... *H04N 23/687* (2023.01); *G02B 27/646* (2013.01); *H04M 1/02* (2013.01);
(Continued)

(58) Field of Classification Search
CPC ........ H04N 23/50; H04N 23/51; H04N 23/54; H04N 23/55; H04N 23/57; H04N 23/68;
(Continued)

(56) References Cited

U.S. PATENT DOCUMENTS

2012/0182436 A1 7/2012 Hu et al.
2013/0107068 A1* 5/2013 Kim ..................... G02B 27/646
348/208.7
(Continued)

FOREIGN PATENT DOCUMENTS

CN 105573014 A 5/2016
CN 205507322 U 8/2016
(Continued)

OTHER PUBLICATIONS

Chinese First Office Action, Chinese Application No. 202110886199.2, mailed Oct. 25, 2022 (24 pages).
(Continued)

*Primary Examiner* — Twyler L Haskins
*Assistant Examiner* — Akshay Trehan
(74) *Attorney, Agent, or Firm* — Ladas & Parry LLP

(57) ABSTRACT

The present application provides a motor, a camera module and an electronic device. The motor includes: an upper cover; a base, cooperatively forming an accommodating space with the upper cover; a carrying assembly, arranged in the accommodating space, and configured to carry a lens of the camera module; one or more first coils, arranged in the accommodating space, and fixedly connected to the upper cover; and one or more magnets, arranged on the carrying assembly, and configured to cooperate with the one or more first coils to drive the carrying assembly to move relative to the upper cover. The carrying assembly is enabled to drive the lens to move.

20 Claims, 11 Drawing Sheets

(51) Int. Cl.

| | |
|---|---|
| *H02K 41/035* | (2006.01) |
| *H04M 1/02* | (2006.01) |
| *H04N 23/51* | (2023.01) |
| *H04N 23/54* | (2023.01) |
| *H04N 23/55* | (2023.01) |
| *H04N 23/57* | (2023.01) |

(52) U.S. Cl.

CPC ............. *H04N 23/51* (2023.01); *H04N 23/54* (2023.01); *H04N 23/55* (2023.01); *H04N 23/57* (2023.01); *G03B 2205/0069* (2013.01); *G03B 2205/0076* (2013.01); *H02K 41/0354* (2013.01)

(58) Field of Classification Search

CPC .. H04N 23/682; H04N 23/685; H04N 23/687; G02B 27/64; G02B 27/646; G03B 2205/0007; G03B 2205/0038; G03B 2205/0053; G03B 2205/0069; G03B 2205/0076; H02K 41/0354; H02K 41/0356; H04M 1/02

See application file for complete search history.

(56) References Cited

U.S. PATENT DOCUMENTS

| | | | |
|---|---|---|---|
| 2016/0161757 A1 | 6/2016 | Hee et al. | |
| 2018/0203203 A1* | 7/2018 | Lee ...................... | H04N 23/687 |
| 2019/0289180 A1 | 9/2019 | Wang | |
| 2021/0266465 A1* | 8/2021 | Wang ................. | G02B 13/0065 |
| 2024/0048830 A1* | 2/2024 | Bian ................... | G02B 27/646 |

FOREIGN PATENT DOCUMENTS

| | | | | |
|---|---|---|---|---|
| CN | 107229169 | A | | 10/2017 |
| CN | 107277338 | A | | 10/2017 |
| CN | 208079225 | U | | 11/2018 |
| CN | 209248213 | U | | 8/2019 |
| CN | 110784650 | A | | 2/2020 |
| CN | 111164963 | A | | 5/2020 |
| CN | 111355872 | A | | 6/2020 |
| CN | 211266959 | U | * | 8/2020 |
| CN | 111698352 | A | | 9/2020 |
| CN | 111917965 | A | | 11/2020 |
| CN | 112689074 | A | | 4/2021 |
| CN | 112788217 | A | | 5/2021 |
| CN | 112886788 | A | | 6/2021 |
| CN | 112911092 | A | | 6/2021 |
| CN | 112911107 | A | | 6/2021 |
| CN | 113068362 | A | | 7/2021 |
| CN | 113489886 | A | | 10/2021 |
| CN | 113691701 | A | | 11/2021 |
| WO | 2021120225 | A1 | | 6/2021 |

OTHER PUBLICATIONS

Chinese Second Office Action, Chinese Application No. 202110886199.2, mailed Mar. 2, 2023 (7 pages).

Chinese Notification to Grant Patent Right for Invention, Chinese Application No. 202110886199.2, mailed Apr. 20, 2023 (5 pages).

Chinese First Office Action, Chinese Application No. 202110886570.5, mailed Nov. 23, 2022 (49 pages).

Chinese Notification to Grant Patent Right for Invention, Chinese Application No. 202110886570.5, mailed Apr. 20, 2023 (3 pages).

International Search Report, International Application No. PCT/CN2022/107514, mailed Sep. 29, 2022 (17 pages).

* cited by examiner

100

71

711

712

<u>731</u>

80

810

81

83

820

82

81

816

813

810

814

816

816

812

815

816

80

822

1000

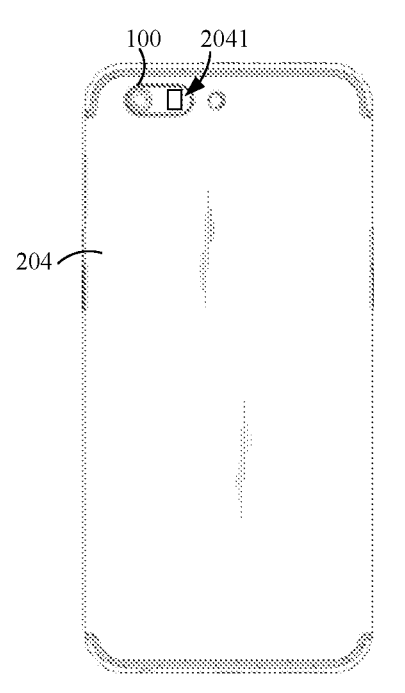
FIG. 20
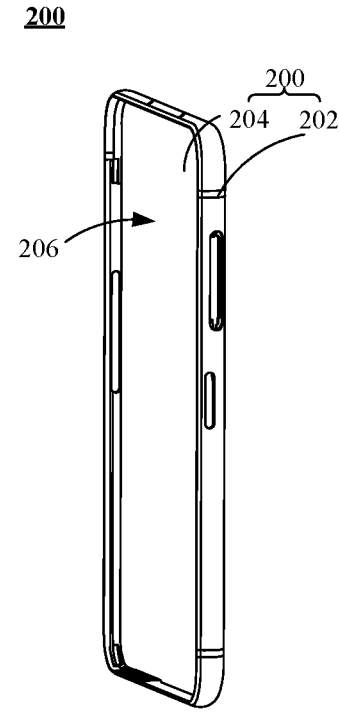
FIG. 21
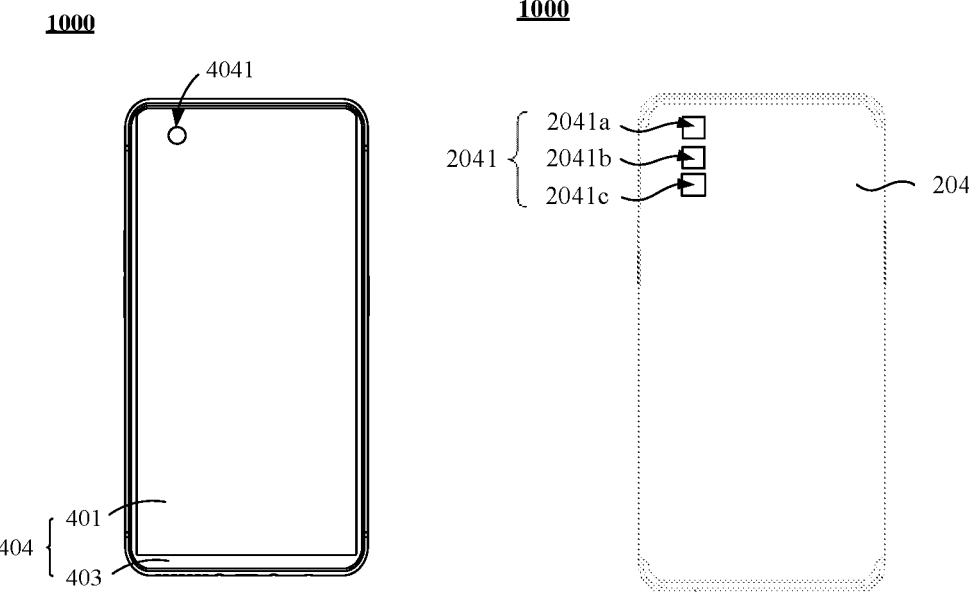
FIG. 22
FIG. 23

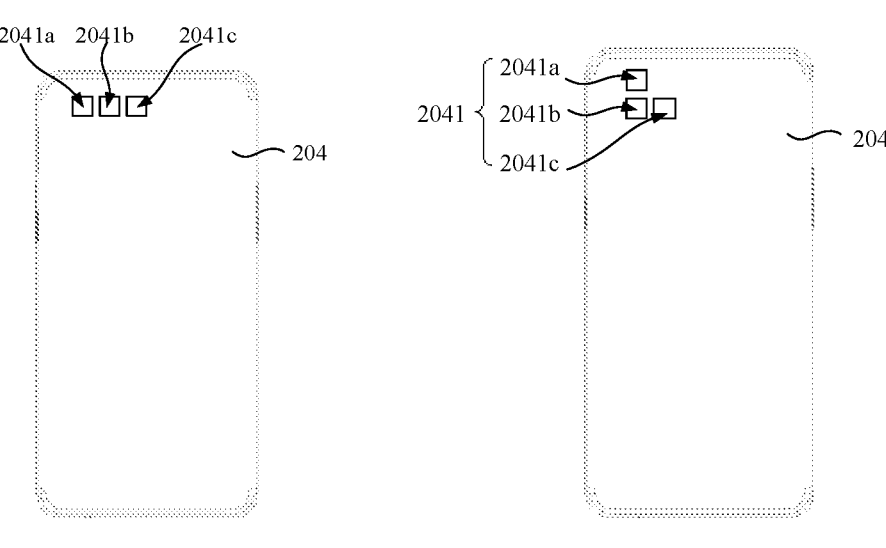
FIG. 24                    FIG. 25

MOTOR, CAMERA MODULE, AND ELECTRONIC DEVICE

CROSS REFERENCE TO RELATED APPLICATIONS

The present disclosure is a continuation of International Patent Application No. PCT/CN2022/107514, filed on Jul. 22, 2022, which claims priority to Chinese Patent Application No. CN202110886570.5, filed on Aug. 3, 2021, and Chinese Patent Application No. CN202110886199.2, filed on Aug. 3, 2021, the entire contents of which are herein incorporated by reference in their entireties.

TECHNICAL FIELD

The present disclosure relates to the technical field of electronic technology, in particular to a motor, a camera module, and an electronic device.

BACKGROUND

Electronic devices, such as smart phones and tablets, have become essential tools in people's daily life. With the development of related technologies, people's demand for shooting functions of electronic devices is increasing, especially image-stabilization functions. The image-stabilization functions gradually become the focus of users' attention. In the related technologies, an optical image-stabilization (OIS) module is usually installed in a camera module, so as to achieve image stabilization by moving the lens through the optical image-stabilization module. However, only image stabilization with a small angle can be achieved, and the needs of the users cannot be satisfied.

SUMMARY

In a first aspect, some embodiments of the present disclosure provide a motor for a camera assembly. The motor includes: an upper cover; a base, cooperatively forming an accommodating space with the upper cover; a carrying assembly, arranged in the accommodating space, and configured to carry a lens of the camera module; one or more first coils, arranged in the accommodating space, and fixedly connected to the upper cover; and one or more magnets, arranged on the carrying assembly, and configured to cooperate with the one or more first coils to drive the carrying assembly to move relative to the upper cover. The carrying assembly is enabled to drive the lens to move.

In a second aspect, some embodiments of the present disclosure provide a camera module. The camera module, includes: a baseplate; an outer shell, cooperatively forming a receiving chamber with the baseplate; a module circuit board, arranged in the receiving chamber, and located on the baseplate; an image sensor, arranged in the receiving chamber, and fixed on the module circuit board; a lens, arranged on a side of the image sensor away from the module circuit board. The image sensor is configured to convert an optical signal collected by the lens into an electrical signal; a first motor, arranged in the receiving chamber, located on the side of the image sensor away from the module circuit board; and a second motor, arranged between the first motor and the image sensor, connected to the base of the first motor, and configured to drive the image sensor to move.

The first motor includes: an upper cover; a base, cooperatively forming an accommodating space with the upper cover; a carrying assembly, arranged in the accommodating space, and configured to carry the lens; one or more first coils, arranged in the accommodating space, and fixedly connected to the upper cover; and one or more magnets, arranged on the carrying assembly, and configured to cooperate with the one or more first coils to drive the carrying assembly to move relative to the upper cover. The carrying assembly is enabled to drive the lens to move.

In a third aspect, some embodiments of the present disclosure provide an electronic device. The electronic device includes: a housing; a display screen, cooperatively forming an accommodation space with the housing; a front camera, arranged in the accommodation space; and a rear camera, arranged in the accommodation space.

The front camera or the rear camera includes: a baseplate; an outer shell, cooperatively forming a receiving chamber with the baseplate; a module circuit board, arranged in the receiving chamber, and located on the baseplate; an image sensor, arranged in the receiving chamber, and fixed on the module circuit board; a lens, arranged on a side of the image sensor away from the module circuit board, the image sensor being configured to convert an optical signal collected by the lens into an electrical signal; a first motor, arranged in the receiving chamber, located on the side of the image sensor away from the module circuit board; and a second motor, arranged between the first motor and the image sensor, connected to the base of the first motor, and configured to drive the image sensor to move.

The first motor includes: an upper cover; a base, cooperatively forming an accommodating space with the upper cover; a carrying assembly, arranged in the accommodating space, and configured to carry the lens; one or more first coils, arranged in the accommodating space, and fixedly connected to the upper cover; and one or more magnets, arranged on the carrying assembly, and configured to cooperate with the one or more first coils to drive the carrying assembly to move relative to the upper cover. The carrying assembly is enabled to drive the lens to move.

BRIEF DESCRIPTION OF THE DRAWINGS

In order to explain technical solutions of embodiments of the present disclosure more clearly, the following will briefly introduce figures needed to use in the description of the embodiments. Obviously, the figures in the following are only some embodiments of the present disclosure. For those skilled in the art, other figures may also be obtained from these figures.

FIG. 20 is a schematic rear structural view of the electronic device in FIG. 19.

FIG. 21 is a schematic structural view of a housing in FIG. 19.

FIG. 22 is a schematic front structural view of an electronic device according to some embodiments of the present disclosure.

FIG. 23 is a schematic rear structural view of an electronic device according to some embodiments of the present disclosure.

FIG. 24 is a schematic rear structural view of an electronic device according to some embodiments of the present disclosure.

FIG. 25 is a schematic rear structural view of an electronic device according to some embodiments of the present disclosure.

DETAILED DESCRIPTIONS

The present disclosure is further described in detail below in combination with the figures and embodiments. In particular, the following embodiments are only used to describe the present disclosure, but do not to limit the scope of the present disclosure. Similarly, the following embodiments are only some embodiments of the present disclosure, but not all embodiments of the present disclosure. All other embodiments obtained by those skilled in the art without any creative work belong to the protection scope of the present disclosure.

The reference to "embodiment" in the present disclosure means that the specific features, structures, or characteristics described in combination with embodiments may be included in at least one embodiment of the present disclosure. The phrase appearing in various positions in the description does not necessarily refer to the same embodiment, nor is it an independent or alternative embodiment mutually exclusive with other embodiments. Those skilled in the art may explicitly and implicitly understand that the embodiments described herein may be combined with other embodiments.

Figure 1:
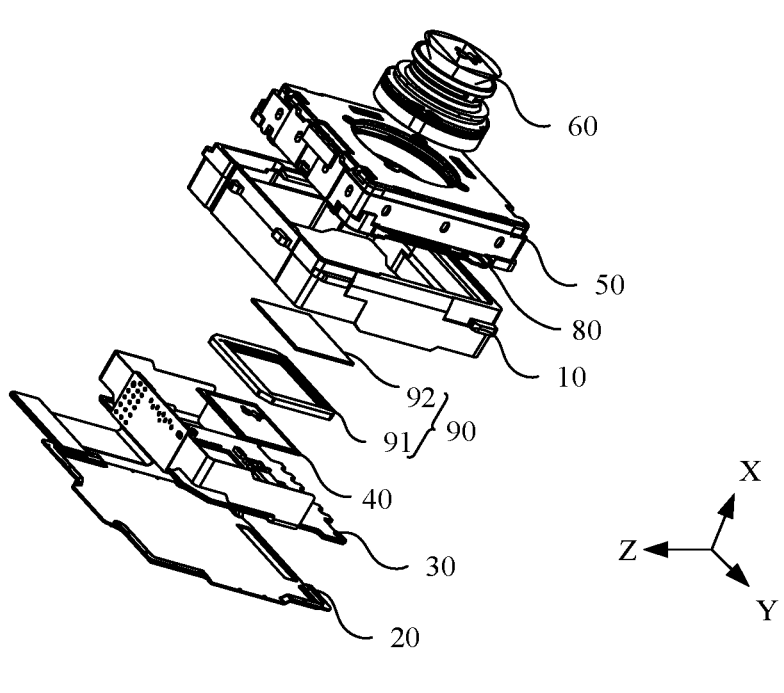
FIG. 1 is a schematic perspective exploded view of a camera module according to some embodiments of the present disclosure.
Figure 2:
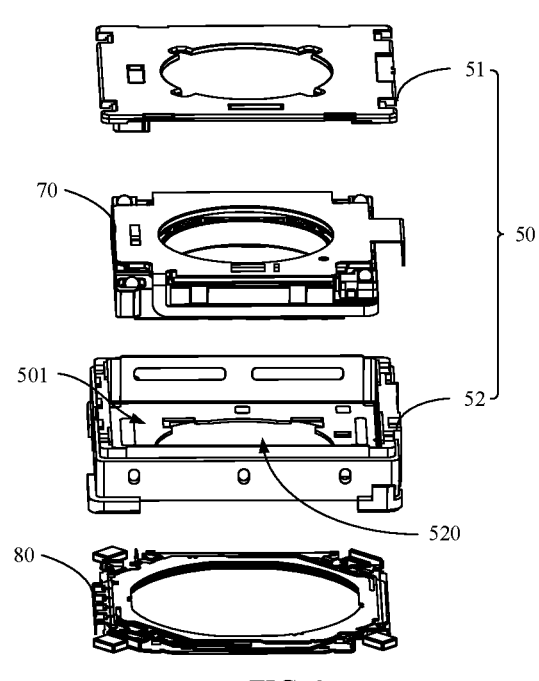
FIG. 2 is a schematic perspective exploded view of some structures in FIG. 1.

Some embodiments of the present disclosure provide a camera module. As shown in FIGS. 1 and 2, the camera module 100 may include an outer shell 10 and a baseplate 20. The outer shell 10 and the baseplate 20 cooperatively form a receiving chamber. In some embodiments, the camera module may also include a top plate (which is not shown in the figures), and the top plate, the outer shell 10, and the baseplate 20 may cooperatively form the receiving chamber. The camera module 100 may also include a first circuit board 30 received in the receiving chamber and arranged on the baseplate 20, an image sensor 40 arranged on the first circuit board 30, an inner shell 50 received in the receiving chamber and arranged above the image sensor 40, a lens 60 at least partially received in the inner shell 50, a first image-stabilization mechanism 70 received in the inner shell 50, a second image-stabilization mechanism 80 arranged between the image sensor 40 and the inner shell 50, and a light-filtering assembly 90 arranged between the image sensor 40 and the second image-stabilization mechanism 80.

The inner shell 50 and the first image-stabilization mechanism 70 may be integrated together to form a first motor. The second image-stabilization mechanism 80 may also be referred to as a second motor. The first motor and the second motor may also be integrated together to form a motor module. The first image-stabilization mechanism 70 is configured to carry the lens 60 and drive the lens 60 to move or shift relative to the inner shell 50. The second image-stabilization mechanism 80 is configured to drive the image sensor 40 to move.

It should be noted that, the terms "includes/including" and "have/has/having" in some embodiments of the present disclosure and any deformation thereof are intended to cover non-exclusive inclusion. The terms "first", "second" and "third" in some embodiments of the present disclosure are only used for descriptive purposes, and cannot be understood as indicating or implying relative importance or implicitly indicating the number of indicated technical features. Therefore, a feature defined as "first," "second," and "third" may explicitly or implicitly include at least one such feature. All directional indications (such as up, down, left, right, front, rear, etc.) in some embodiments of the present disclosure are only used to explain the relative position relationship, motion, etc., between components in a specific attitude (as shown in the figures). If the specific attitude changes, the directional indication may also change accordingly.

In some embodiments of the present disclosure, the first image-stabilization mechanism 70 may drive the lens 60 to move, the second image-stabilization mechanism 80 may drive the image sensor 40 to move. In this way, dual image stabilization of the lens 60 and the image sensor 40 may be achieved. Compared with realizing image stabilization only by using an optical image-stabilization module to move the lens 60 in the related technology, a greater image-stabilization angle may be realized.

When the camera module 100 is used in an electronic device, sensors, such as gyroscopes or accelerometers, of the electronic device may detect a shake of the lens 60, generate a shake signal, and transmit the shake signal to a processing chip of the electronic device and/or the camera module 100. The processing chip of the electronic device and/or the camera module 100 may acquire or calculate displacements required to be compensated by the first image-stabilization mechanism 70 and the second image-stabilization mechanism 80. In this way, the first image-stabilization mechanism 70 and the second image-stabilization mechanism 80 may compensate the shake of the lens 60 based on shake directions of the lens 60 and the displacements of the lens 60, thereby realizing optical image-stabilization and improving an imaging effect of the camera module 100.

The outer shell 10 is a frame and may be made of metal. For example, the outer shell 10 may be made of stainless steel or other kinds of alloy. As shown in FIG. 1, the outer shell 10 may be a square-shaped frame and may be formed by four side walls connected in sequence from head to tail. In some embodiments, the outer shell 10 may also be circular or hexagonal, which is not limited by embodiments of the present disclosure, and those skilled in the art may choose the shape of the outer shell 10 according to actual needs.

The baseplate 20 is a plate-shaped structure and may be made of metal. For example, the baseplate 20 may be made of stainless steel or other kinds of alloy. As shown in FIG. 1, the baseplate 20 may be square-shaped, and may cooperatively form the receiving chamber with the outer shell 10. In some embodiments, the baseplate 20 may also be circular or hexagonal, which is not limited by embodiments of the present disclosure, and those skilled in the art may choose the shape of the baseplate 20 according to actual needs.

Figure 3:
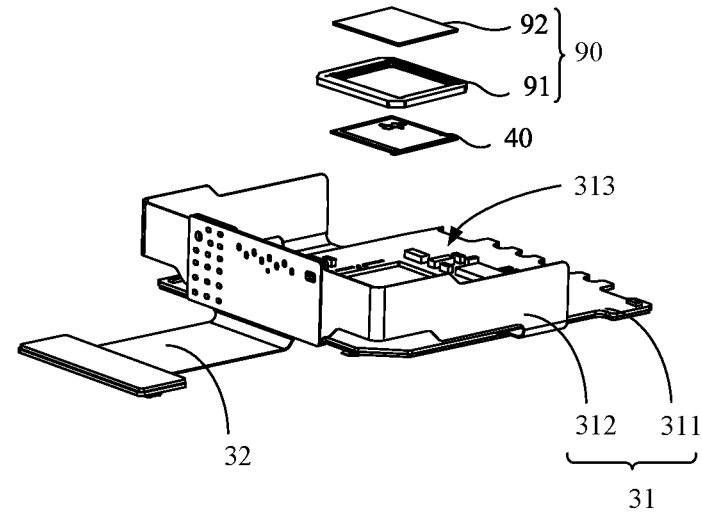
FIG. 3 is a schematic structural view of a first circuit board in FIG. 1.

As shown in FIG. 3, the first circuit board 30 may include an unbendable first portion 31 and a bendable second portion 32. In some embodiments, the first portion 31 may include a bottom board 311 and a side board 312, and the side board 312 and the bottom board 311 may cooperatively form a receiving space 313 for receiving the image sensor 40 and the light-filtering assembly 90. The second portion 32 may be a flexible circuit board, and the second portion 32 may be extended out of the receiving chamber formed by the outer shell 10 and the baseplate 20, so as to be electrically connected to other assemblies of the electronic device.

As shown in FIG. 3, the image sensor 40 may be arranged on the bottom board 311. The image sensor 40 is configured to convert optical signals collected by the lens 60 to electrical signals, so as to satisfy imaging requirements of the camera module 100. The image sensor 40 may be a Charge Coupled Device (CCD) image sensor, or a Complex Metal Oxide Semiconductor (CMOS) image sensor.

As shown in FIG. 1, the inner shell 50 is arranged on a side of the image sensor 40 away from the first circuit board 30. As shown in FIG. 2, the inner shell 50 may include an upper cover 51 and a base 52. The upper cover 51 is covered on the base 52 and connected to the base 52, so as to form an accommodating space 501 between the upper cover 51 and the base 52. The first image-stabilization mechanism 70 may be movably accommodated in the accommodating space 501. For example, the first image-stabilization mechanism may move along a first direction X, a second direction Y, and a third direction Z in the accommodating space 501.

Figure 4:
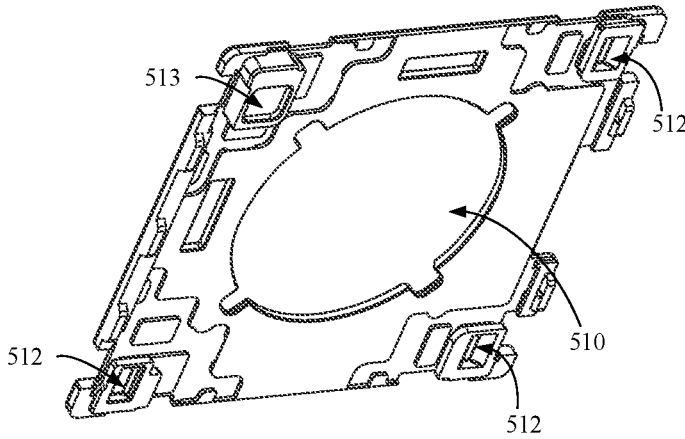
FIG. 4 is a schematic structural view of an upper cover in FIG. 2.

As shown in FIG. 4, the upper cover 51 may be plate-shaped, and may define a first through hole 510. The upper cover 51 may be square-shaped. Adjacent side walls of the upper cover 51 define four corners, each of three of the four corners defines a second limiting groove 512, and the other of the four corners defines a fourth limiting groove 513. The second limiting groove 512 may be extended along the third direction Z. The fourth limiting groove 513 may be square-shaped. In some embodiments, the second limiting groove may also be extended along the second direction Y, which is not limited by embodiments of the present disclosure, and those skilled in the art may choose the extension direction of the second limiting groove according to actual needs.

As shown in FIG. 2, the base 52 may include four side walls connected in sequence from head to tail and a bottom wall. The bottom wall may define a fourth through hole 520. The base 52 and the upper cover 51 cooperatively form the accommodating space 501. In some embodiments, the base 52 may also be plate-shaped, and the upper cover 51 may include four side walls connected in sequence from head to tail and an upper wall, which is not limited by embodiments of the present disclosure, and those skilled in the art may choose according to actual needs.

Figure 18:
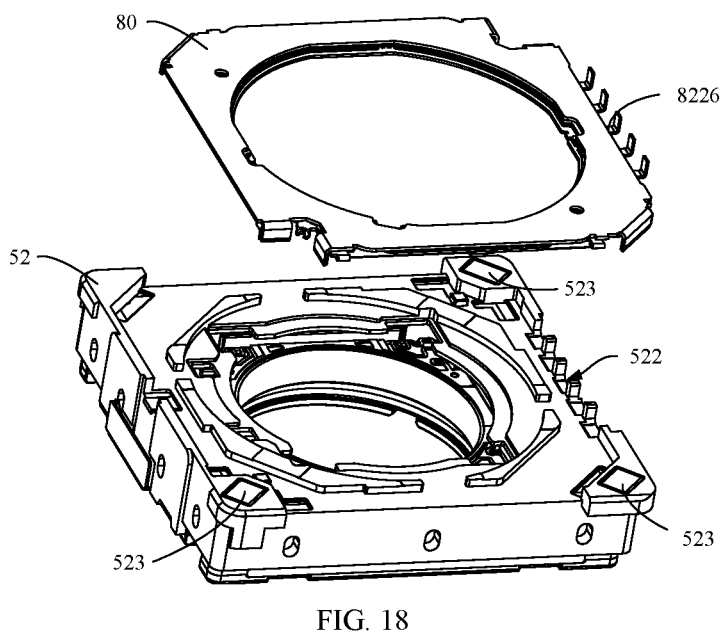
FIG. 18 is schematic perspective exploded view of some structures in FIG. 1.

As shown in FIG. 18, a side of the base 52 away from the upper cover 51 may define an avoidance structure 522. Adjacent side walls of the base 52 define four corners. Each of three corners of the base 52 is arranged with a fourth magnet 523. The fourth magnet 523 may be arranged on the side of the base 52 away from the upper cover 51.

As shown in FIG. 1, the lens 60 may be arranged on the side of the image sensor 40 away from the first circuit board 30, and may face the image sensor 40 in the first direction X (the first direction X is parallel to an optical-axis direction of the lens 60). As shown in the figures, the lens 60 may be cylinder-shaped. In some embodiments, the lens 60 may also be arranged in the shape of a square column or a hexagonal column, which is not limited by embodiments of the present disclosure, and those skilled in the art may choose according to actual needs.

In some embodiments, the lens 60 may be made of glass or plastic. The lens 60 is mainly used to change a propagation path of light and focus the light. The lens 60 may include multiple groups of lenses that mutually correct and filter the light. When the light passes through the lens 60, multiple groups of lenses may filter out stray light (such as infrared light) layer by layer, so as to improve the imaging effect of the camera module 100.

The first image-stabilization mechanism 70 may be configured to drive the lens 60 to move along the first direction X, the second direction Y, and the third direction Z. The first direction X is parallel to the optical-axis direction of lens 60. The second direction Y and the third direction Z are perpendicular to each other, and the second direction Y and the third direction Z are perpendicular to the optical-axis direction of lens 60.

In some embodiments, the first direction X may also be directly referred to as the optical-axis direction. The second direction Y and the third direction Z may be collectively referred to as the direction perpendicular to the optical-axis direction. In order to distinguish the second direction Y and the third direction Z, the second direction Y may be referred to as a first sub-direction, and the third direction Z may be referred to as a second sub-direction.

The first image-stabilization mechanism 70 drives the lens 60 to move along the first direction X, so as to enable camera module 100 to achieve a function of autofocus photography. The first image-stabilization mechanism 70 drives the lens 60 to move along the second direction Y and the third direction Z, so as to achieve an image-stabilization function of the camera module 100.

It should be noted that, in some embodiments of the present disclosure, the description that the first image-stabilization mechanism 70 drives the lens 60 to move along the first direction X, the second direction Y, and the third direction Z, indicates that the first image-stabilization mechanism 70 may drive the lens 60 to move along the first direction X, may drive the lens to move along the second direction Y, and may drive the lens to move along the third direction Z, but does not indicate that the movements of the lens 60 along the first direction X, the second direction Y, and the third direction Z occur simultaneously. For example, in some embodiments of the present disclosure, the description that the first image-stabilization mechanism 70 drives the lens 60 to move along the first direction X, the second direction Y, and the third direction Z, may indicate that the first image-stabilization mechanism 70 drives the lens 60 to move along the first direction X, or drives the lens 60 to move along the second direction Y, or drives the lens 60 to move along the third direction Z, or drives the lens 60 to move along the first direction X and the second direction Y simultaneously, or drives the lens 60 to move along the first direction X and the third direction Z simultaneously, or drives the lens 60 to move along the second direction Y and the third direction Z simultaneously, or drives the lens 60 to move along the first direction X, the second direction Y, and the third direction Z simultaneously.

In addition, in the description of embodiments of the present disclosure, the description that two objects are parallel to each other may allow a certain error range. For example, the error range may be –5°~5°. That is, when the angle between the two objects is in the range of –5°~5°, it may be considered that the two objects are parallel to each other. For example, the description that the first direction X is parallel to the optical-axis direction of the lens 60 may allow a corresponding error range, and the corresponding error range may be set based on an actual situation, such as –3°~3°, –5°~5°, or –8°~8°, and so on.

Similarly, the description that two objects are perpendicular to each other may allow a certain error range. For example, the error range may be –5°~5°. That is, when the angle between the two objects is in the range of 85°~95°, it may be considered that the two objects are perpendicular to each other. For example, the description that the second direction Y is perpendicular to the third direction Z may allow a corresponding error range, and the corresponding error range may be set based on an actual situation, such as –3°~3°, –5°~5°, or –8°~8°, and so on.

The mode described above for the first image-stabilization mechanism 70 to drive the lens 60 to move is only an example of the present disclosure, and cannot be understood as restrictions on embodiments of the present disclosure. In some embodiments, the first image-stabilization mechanism 70 may also be configured to drive the lens 60 to swing in the second direction Y and the third direction Z, so as to achieve the image-stabilization effect, which is not limited by embodiments of the present disclosure, and those skilled in the art may choose according to actual needs.

Figure 5:
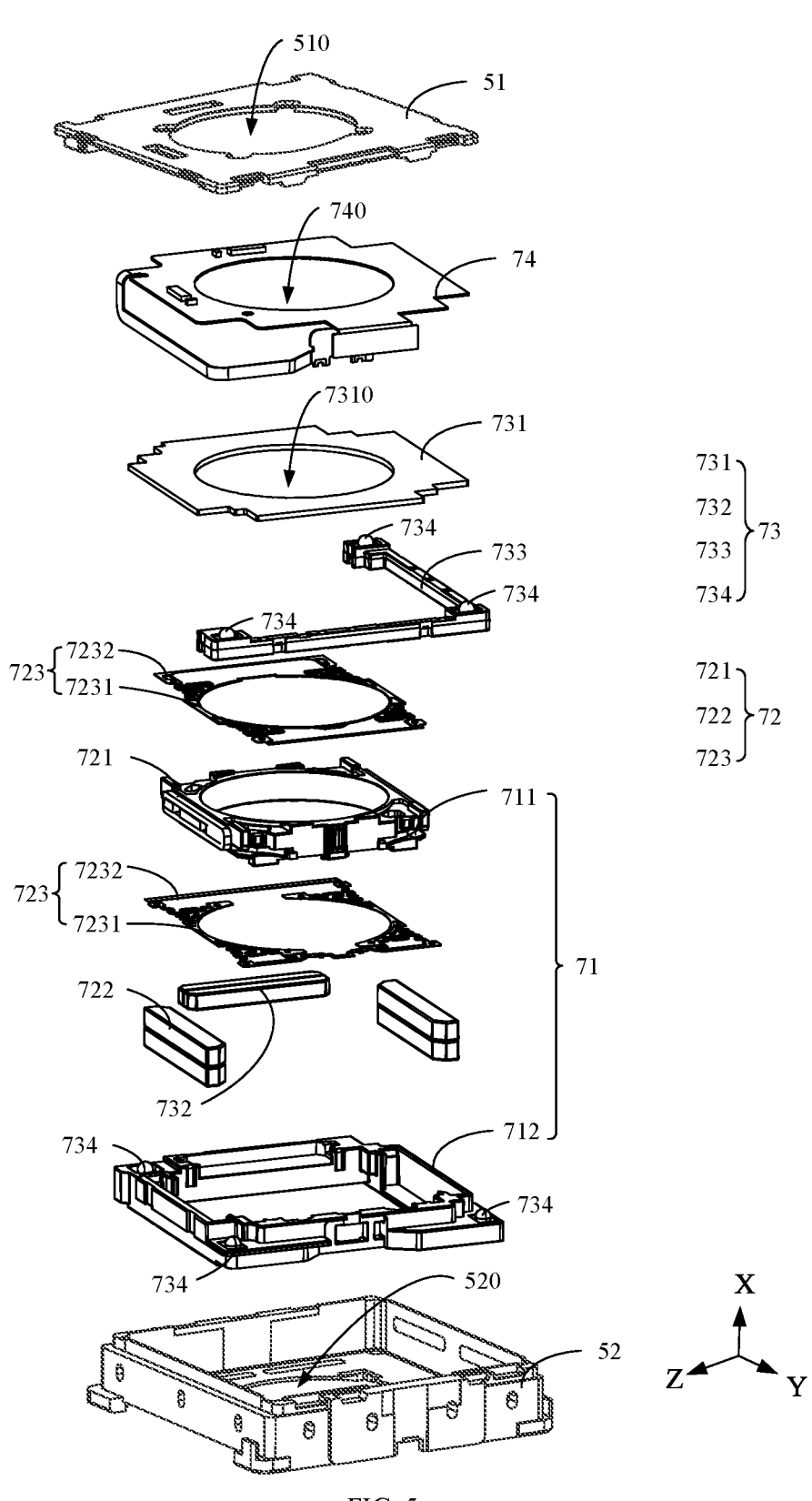
FIG. 5 is a schematic perspective exploded view of a first image-stabilization mechanism in FIG. 2.

Next, the structure of the first image-stabilization mechanism 70 will be described. As shown in FIG. 5, in some embodiments, the first image-stabilization mechanism 70 may include a carrying assembly 71, a first drive assembly 72, a second drive assembly 73, and a second circuit board 74 arranged on the upper cover 51. The carrying assembly 71 may be configured to carry the lens 60. The first drive assembly 72 is arranged on the carrying assembly 71. The first drive assembly 72 may be configured to drive the lens 60 to move along the first direction X to compensate the shake amount of the lens 60 in the first direction X. The second drive assembly 73 may be configured to drive the lens 60 to move along the second direction Y and the third direction Z to compensate the shake amount of the lens 60 in the second direction Y and the third direction Z.

Figure 6:
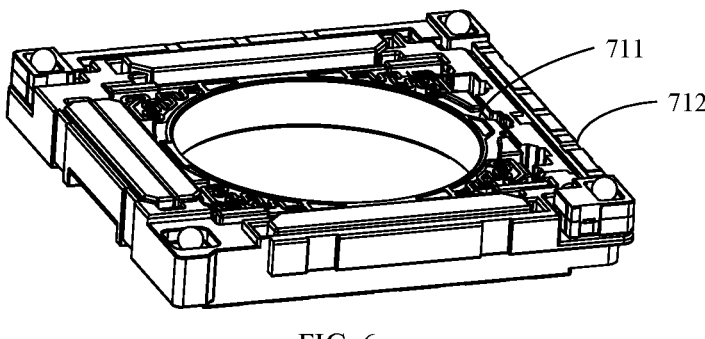
FIG. 6 is a schematic structural view of a carrying assembly in FIG. 5.

As shown in FIG. 6, the carrying assembly 71 may include a first carrier 711 and a second carrier 712. The second carrier 712 is connected to the first carrier 711 and surrounds the first carrier 711.

Figure 7:
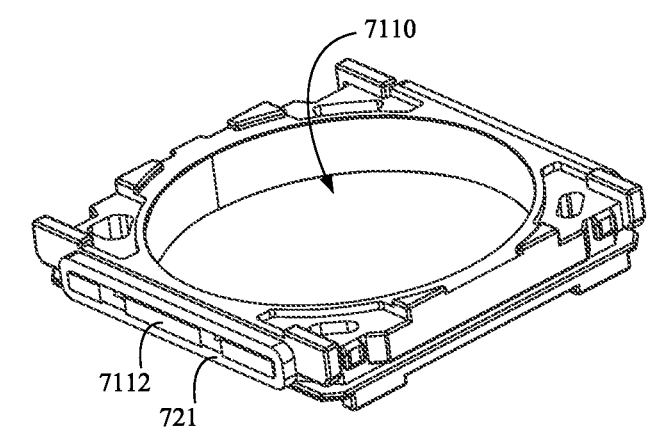
FIG. 7 is a schematic structural view of a first carrier in FIG. 6.

As shown in FIG. 7, the first carrier 711 may be square-shaped, and may define a through hole 7110. The lens 60 may pass through the through hole 7110, and the inner wall of the through hole 7110 may be connected to the lens 60, so as to carry the lens 60. When the first carrier 711 moves, the first carrier 711 may drive the lens 60 to move. In some embodiments, the first carrier 711 may also be circular or hexagonal, which is not limited by embodiments of the present disclosure, and those skilled in the art may choose according to actual needs. In some embodiments, the first carrier 711 may include two opposite outer surfaces, and each of the two outer surfaces may be arranged with a support portion 7112.

Figure 8:
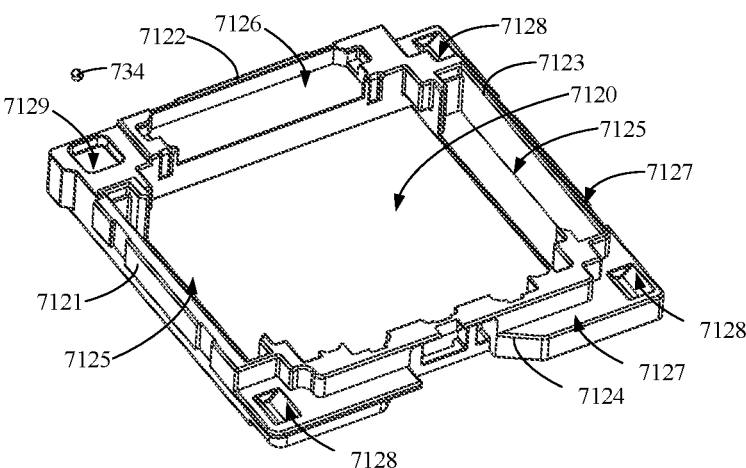
FIG. 8 is a schematic structural view of a second carrier in FIG. 6.

As shown in FIG. 8, the second carrier 712 may be square-shaped. In some embodiments, the second carrier 712 may also be circular, hexagonal, or irregular in shape, which is not limited by embodiments of the present disclosure, and those skilled in the art may choose according to actual needs. In some embodiments, the second carrier 712 may include a first side wall 7121, a second side wall 7122, a third side wall 7123, and a fourth side wall 7124 connected in sequence from head to tail. The first side wall 7121, the second side wall 7122, the third side wall 7123, and the fourth side wall 7124 may have a certain width and are arranged around the first carrier 711 in sequence along a clockwise direction. That is, the first side wall 7121, the second side wall 7122, the third side wall 7123, and the fourth side wall 7124 cooperatively form a storage space 7120. The first carrier 711 is received in the storage space 7120 and may be movable in the storage space 7120. In some embodiments, the first side wall 7121, the second side wall 7122, the third side wall 7123, and the fourth side wall 7124 may also be arranged around the first carrier 711 in sequence along an anticlockwise direction.

Each of the inner side of the first side wall 7121 and the inner side of the third side wall 7123 of the second carrier 712 may define a first installation groove 7125. The second side wall 7122 of the second carrier 712 may define a second installation groove 7126. The outer side of each of the third side wall 7123 and the fourth side wall 7124 of the second carrier 712 may define a sinking groove 7127, and each of the first side wall 7121 and the second side wall 7122 is a protruding portion relative to the sinking groove 7127. The two protruding portions are adjacent to the two sinking grooves 7127.

Adjacent side walls of the second carrier 712 define four corners. Each of three of the four corners defines a first limiting groove 7128, and the other of the four corners defines a third limiting groove 7129. As shown in FIG. 8, in the second carrier 712, each of the corner defined by the third side wall 7123 and the fourth side wall 7124, the corner defined by the third side wall 7123 and the second side wall 7122, and the corner defined by the fourth side wall 7124 and the first side wall 7121 may define a first limiting groove 7128, and the corner defined by the first side wall 7121 and the second side wall 7122 may define the third limiting groove 7129. That is, the third limiting groove 7129 is defined on the protruding portions. The first limiting groove 7128 may be extended along the second direction Y. The third limiting groove 7129 may be square-shaped. In some embodiments, the first limiting groove may also be extended along the third direction Z, which is not limited by embodiments of the present disclosure, and those skilled in the art may choose according to actual needs.

As shown in FIG. 5, the first drive assembly 72 may include one or more first coils 721 sleeved on the support portion 7112 of the first carrier 711, one or more first magnets 722 arranged in the first installation groove 7125 of the second carrier 712, and an elastic structure. The one or more first magnets 722 and the one or more first coils 721 may cooperate to generate a first acting force along the first direction X, and the first acting force drives the first carrier 711 to move along the first direction X relative to the second carrier 712. In some embodiments, the elastic structure may include two elastic sheets 723. One of the two elastic sheets 723 may be arranged on the side of the first carrier 711 close to the upper cover 51, and the other of the two elastic sheets 723 may be arranged on the side of the first carrier 711 close to the base 52. A part of each of the two elastic sheets 723 is connected to the first carrier 711, and the other part of the each of the two elastic sheets 723 is connected to the second carrier 712.

One of the two elastic sheets 723 on the side of the first carrier 711 close to the upper cover 51 may be referred to as an upper elastic sheet, and the other of the two elastic sheets 723 on the side of the first second carrier 711 close to the base 52 may be referred to as a lower elastic sheet. That is, the upper elastic sheet and the lower elastic sheet may be respectively arranged on two sides of the carrying assembly 71 along the optical-axis direction of the lens 60. After the first carrier 711 moves relative to the second carrier 712, the upper elastic sheet and the lower elastic sheet may assist in resetting or returning the first carrier 711.

In some embodiments, each of the two elastic sheets 723 may include a body portion 7231 and a connecting portion 7232 connected to each other. The body portion 7231 of the upper elastic sheet may be arranged on the side of the first carrier 711 close to the upper cover 51. The connecting portion 7232 of the upper elastic sheet may be connected to the side of the second carrier 712 close to the upper cover 51. An elastic acting force may be generated between the body portion 7231 of the upper elastic sheet and the connecting portion 7232 of the upper elastic sheet. The body portion 7231 of the lower elastic sheet may be arranged on the side of the first carrier 711 close to the base 52. The connecting portion 7232 of the lower elastic sheet may be connected to the side of the second carrier 712 close to the base 52. Another elastic acting force may also be generated between the body portion 7231 of the lower elastic sheet and the connecting portion 7232 of the lower elastic sheet. A resultant force of the elastic acting force generated by the upper elastic sheet and the elastic acting force generated by the lower elastic sheet is oriented along the first direction X.

Figure 9:
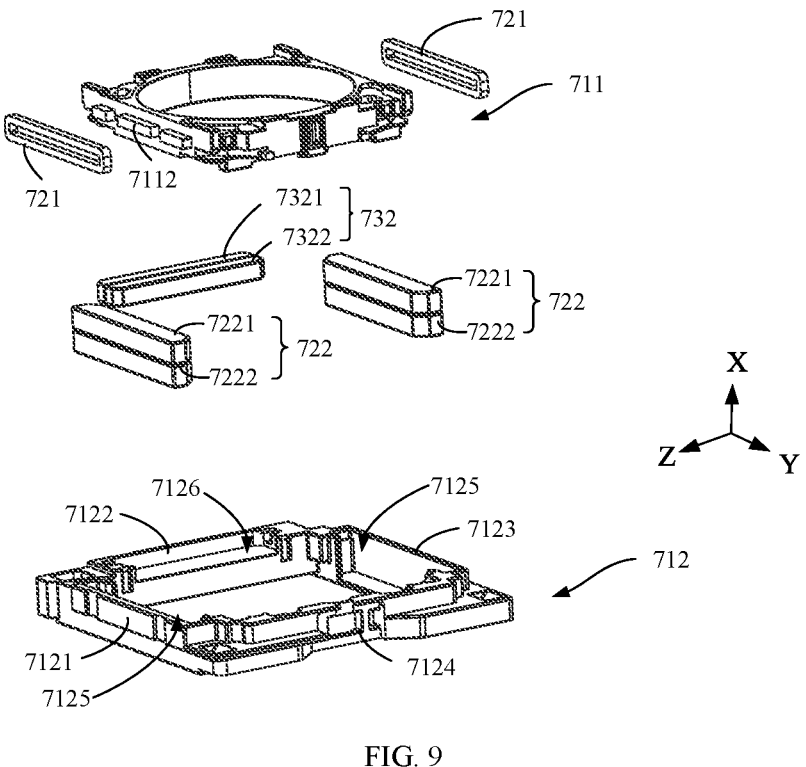
FIG. 9 is a schematic perspective exploded view of some structures in FIG. 5.

The number of the one or more first coils 721 may be two. In some embodiments, the first coil 721 may also be referred to as a first conductive member. Two first coils 721 may be respectively arranged on two opposite sides of the first carrier 711 in the third direction Z. As shown in FIG. 9, each of the two first coils 721 may be sleeved on a corresponding support portion 7112. In some embodiments, the structures of the two first coils 721 may be the same as each other. In some embodiments, the projection of each of the two first coils 721 on a plane parallel to the first direction X is in shape of a ring, and the projection of each of the two first coils 721 on a plane perpendicular to the first direction X is in shape of a strip. In some embodiments, each of the two first coils 721 may also be a single rod structure or a double rod structure, and the structures of the two first coils 721 may also be different from each other, which is not limited by embodiments of the present disclosure, and those skilled in the art may choose according to actual needs.

Each of the one or more first magnets 722 may be a permanent magnet or an electromagnet, and may generate a magnetic field. The number of the one or more first magnets 722 may also be two. In some embodiments, the structures of the two first magnets 722 may be the same as each other. In order to distinguish the two first magnets 722, the two first magnets 722 may be respectively referred to as a first magnetic member and a second magnetic member. That is, the first magnetic member represents one of the two first magnets 722, and the second magnetic member represents the other of the two first magnets 722. In some embodiments, the structures of the two first magnets 722 may also be different from each other, which is not limited by embodiments of the present disclosure, and those skilled in the art may choose according to actual needs.

As shown in FIG. 9, each of the two first magnets 722 is arranged in a corresponding first installation groove 7125. In some embodiments, each of the two first magnets 722 may be located in the storage space 7120 of the second carrier 712. Each of the two first magnets 722 may face a corresponding first coil 721 of the two first coils 721. That is, each of the two first coils 721 is located in the magnetic field of a corresponding first magnet 722 of the two first magnets 722.

Each of the two first coils 721 may face the corresponding first magnet 722 in the third direction Z. That is, the first magnetic member faces one of the two first coils 721 in the third direction Z, and the second magnetic member faces the other of the two first coils 721 in the third direction Z. In some embodiments, each of the two first coils 721 may also face the corresponding first magnet 722 in the second direction Y, which is not limited by embodiments of the present disclosure, and those skilled in the art may choose according to actual needs.

In some embodiments, as shown in FIG. 9, each of the two first magnets 722 may be located on an outer side of the corresponding first coil 721 to cooperate with the corresponding first coil 721 to generate the first acting force along the first direction X. As aforementioned, the elastic structure may generate an elastic acting force along the first direction X. The first acting force and the elastic acting force act together on the first carrier 711, and enable the first carrier 711 to move along the first direction X relative to the second carrier 712. In this way, the first carrier 711 drives the lens 60 to move along the first direction X to achieve autofocus of the lens 60.

The acting force generated by the cooperation of the first magnetic member and the corresponding first coil 721 may be equal to the acting force generated by the cooperation of the second magnetic member and the corresponding first coil 721. In this way, the forces on the opposite two ends of the first carrier 711 are balanced, and the opposite two ends of the first carrier 711 may move along the first direction X at the same speed. In some embodiments, the acting force generated by the cooperation of the first magnetic member and the corresponding first coil 721 may also be unequal to the acting force generated by the cooperation of the second magnetic member and the corresponding first coil 721. In such a case, the forces on the opposite two ends of the first carrier 711 are unbalanced, the opposite two ends of the first carrier 711 move along the first direction X at different speeds, and the first carrier 711 is inclined at a certain angle relative to the plane perpendicular to the optical-axis direction.

Each of the two first magnets 722 has a first portion 7221 and a second portion 7222 arranged along the first direction X. That is, the first magnetic member has a first portion 7221 and a second portion 7222 stacked along the optical-axis direction, and the second magnetic member has a first portion 7221 and a second portion 7222 stacked along the optical-axis direction. The polarity arrangement direction of magnetic poles of the first portion 7221 of the first magnetic member is opposite to the polarity arrangement direction of magnetic poles of the second portion 7222 of the first magnetic member. The polarity arrangement direction of magnetic poles of the first portion 7221 of the second magnetic member is opposite to the polarity arrangement direction of magnetic poles of the second portion 7222 of the second magnetic member. In this way, the first acting force generated by each of the two first magnets 722 in coopera-tion with the corresponding first coil 721 is oriented along the first direction X. For example, for the first magnetic member or the second magnetic member, the end of the first portion 7221 close to the lens 60 may be a N-pole, and the end of the first portion 7221 away from the lens 60 may be a P-pole; the end of the second portion 7222 close to the lens 60 may be a P-pole, and the end of the second portion 7222 away from the lens 60 may be a N-pole.

Each of the two first coils 721 faces the first portion 7221 and the second portion 7222 of the corresponding first magnet 722 simultaneously. That is, one of the two first coils 721 faces both the first portion 7221 of the first magnetic member and the second portion 7222 of the first magnetic member. The other of the two first coils 721 faces both the first portion 7221 of the second magnetic member and the second portion 7222 of the second magnetic member.

As shown in FIG. 9, each of the two the first coils 721 may be in shape of a rounded rectangle. Each of the two first coils 721 has two long edges. One of the two long edges faces the first portion 7221 of the corresponding first magnet 722, and the other of the two long edges faces the second portion 7222 of the corresponding first magnet 722. In some embodiments, the first portion 7221 may be an independent or individual magnet, and the second portion 7222 may be an independent or individual magnet. The first portion 7221 and the second portion 7222 are assembled to form each of the two first magnets 722, which is not limited in embodi-ments of the present disclosure. In some embodiments, each of the two first magnets 722 may have two ends and four magnetic poles, and the first portion 7221 and the second portion 7222 are connected through a non-magnetic mem-ber.

It may be understood that, in some embodiments, the number of the one or more first coils 721 may also be one, and correspondingly, the number of the one or more first magnets 722 may also be one, which is not limited by embodiments of the present disclosure, and those skilled in the art may choose according to actual needs.

Each of the two elastic sheets 723 may be a metal sheet, a spring sheet, or other elastic connecting members, which is not limited by embodiments of the present disclosure, and those skilled in the art may choose according to actual needs. For example, each of the two elastic sheets 723 may be a conductive metal sheet, and each of the two elastic sheets 723 may be formed by etching and other processes. As shown in FIG. 5, the upper elastic sheet may be connected to a power source and be welded with two ends of each of the two first coils 721 to power each of the two first coils 721.

It may be understood that, the first drive assembly 72 described above is only an embodiment of the present disclosure and cannot be understood as restrictions on the embodiments of the present disclosure. In some embodi-ments, the first drive assembly 72 may not include the two elastic sheets 723, and a rolling structure may be adopted to enable the first carrier 711 to move along the first direction X relative to the second carrier 712 under the action of the first acting force. For example, each of the first carrier 711 and/or the second carrier 712 may define a groove extended along the first direction X, and a rolling ball may be received in the groove and rolled in the groove. In this way, the first carrier 711 may move along the first direction X relative to the second carrier 712 under the action of the first acting force.

As shown in FIG. 5, the second drive assembly 73 may include a coil board 731 fixedly connected to the second circuit board 74, a second magnet 732 arranged in the second installation groove 7126 on the second carrier 712, a guiding member 733 arranged between the second carrier 712 and the coil board 731, and a rolling structure. The rolling structure may include one or more rolling balls 734.

Figure 10:
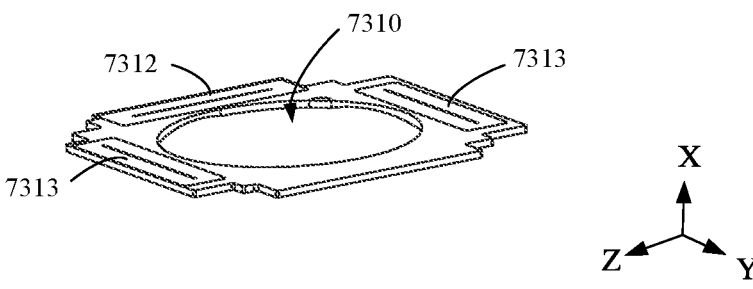
FIG. 10 is a schematic structural view of a coil board in FIG. 5.

The coil board 731 may be fixed on the upper cover 51 through the second circuit board 74. As shown in FIG. 10, the coil board 731 defines a third through hole 7310. The coil board 731 may be square-shaped, circle-shaped, or hexagon-shaped, which is not limited by embodiments of the present disclosure, and those skilled in the art may choose according to actual needs. The coil board 731 may include a second coil 7312 and one or more third coils 7313. The number of the second coil 7312 may be one, and the number of the one or more third coils 7313 may be two. In some embodiments, the second coil 7312 may be referred to as a second conductive member, and each of the two third coils 7313 may also be referred to as the second conductive member. For example, when the number of the second coil 7312 is one and the number of the one or more third coils 7313 is two, it may be understood that, the number of the second conductive members is three.

In some embodiments, the projection of each of the second coil 7312 and the two third coils 7313 on the plane perpendicular to the first direction X may be in shape of a ring, and the projection of each of the second coil 7312 and the two third coils 7313 on the plane parallel to the first direction X may be in shape of a strip, which is not limited by embodiments of the present disclosure, and those skilled in the art may choose according to actual needs.

The two third coils 7313 are disposed opposite to each other in the third direction Z, that is, the two third coils 7313 are arranged along the third direction Z. The two third coils 7313 are arranged in one-to-one correspondence with the two first magnets 722. That is, each of the two third coils 7313 is located in the magnetic field generated by a corre-sponding first magnet 722 of the two first magnets 722.

In some embodiments, each of the two first magnets 722 faces a corresponding third coil 7313 of the two third coils 7313 in the first direction X. That is, the first magnetic member faces one of the two third coils 7313 in the first direction X, and the second magnetic member faces the other of the two third coils 7313 in the first direction X. In this way, a third acting force along the third direction Z may be generated. The third acting force drives the second carrier 712 to move along the third direction Z relative to the upper cover 51 based on the rolling action of the rolling structure, then the second carrier 712 drives the lens 60 to move along the third direction Z through the first carrier 711, so as to compensate the shake of the lens 60 in the third direction Z.

The number of the second magnet 732 may be one. As shown in FIG. 9, the second magnet 732 may be arranged in the second installation groove 7126, and the second magnet 732 may face the second coil 7312 in the first direction X. In this way, a second acting force along the second direction Y may be generated. The second acting force drives the second carrier 712 to move along the second direction Y relative to the upper cover 51 based on the rolling action of the rolling structure, then the second carrier 712 drives the lens 60 to move along the second direction Y through the first carrier 711, so as to compensate the shake of the lens 60 in the second direction Y. In some embodiments, the second acting force may be a general concept, and may include the second acting force along the second direction Y and the third acting force along the third direction Z described in some embodiments.

In some embodiments, the number of the second coils 7312 may also be two, and correspondingly, the number of the second magnets 732 may also be two. The two second coils 7312 may be arranged in one-to-one correspondence with the two second magnets 732, so as to cooperate with the two second magnets 732 to generate the second acting force along the second direction Y.

As shown in FIG. 9, the second magnet 732 may include the first portion 7321 and the second portion 7322. The first portion 7321 and the second portion 7322 are stacked in the second direction Y. In some embodiments, the first portion 7321 and the second portion 7322 may also be stacked in the second direction Z, which is not limited by embodiments of the present disclosure, and those skilled in the art may choose according to actual needs.

The polarity arrangement direction of magnetic poles of the first portion 7321 of the second magnet 732 is opposite to the polarity arrangement direction of magnetic poles of the second portion 7322 of the second magnet 732. The projections of the first portion 7321 and the second portion 7322 on the plane perpendicular to the first direction X may be arranged side by side. The projections of the first portion 7321 and the second portion 7322 on the plane parallel to the first direction X may be completely overlapped. In this way, the second acting force generated by the cooperation of the second magnet 732 and the second coil 7312 is oriented along the second direction Y. Other features of the second magnet 732 may be the same as or similar to those of each of the two first magnets 722, which will not be repeated herein.

It should be noted that, in some embodiments of the present disclosure, the description that two objects are completely overlapped allows a certain error range. For example, the error range may be 90%-100%. That is, when 90%-100% of one of the two objects is covered by the other of the two objects, it may be considered that two objects are completely overlapped. For example, the description that the projections of the first portion 7321 and the second portion 7322 of the second magnet 732 on the plane parallel to the first direction X are completely overlapped may allow a corresponding error range, and the corresponding error range may be set based on an actual situation, such as 80%-100%, 90%-100%, or 95%-100%, and so on.

Figure 11:
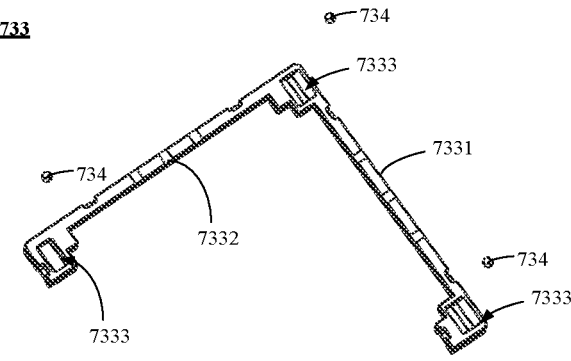
FIG. 11 is a schematic structural view of a guiding member in FIG. 5.

As shown in FIGS. 5 and 11, the guiding member 733 may be stacked with the second carrier 712 in the first direction X. The guiding member 733 may include a first portion 7331 and a second portion 7332 connected to each other. The first portion 7331 and the second portion 7332 are arranged perpendicular to each other to form a shape of "L". The first portion 7331 of the guiding member 733 may be arranged in the sinking groove 7127 defined on the third side wall 7123 of the second carrier 712. The second portion 7332 of the guiding member 733 may be arranged in the sinking groove 7127 defined on the fourth side wall 7124 of the second carrier 712. In this way, the thickness of the first motor in the first direction X may be reduced, and the overall thickness of the camera module 100 may be reduced. In some embodiments, the guiding member 733 may be embedded into the sinking groove 7127 defined on the third side wall 7123 and the sinking groove 7127 defined on the fourth side wall 7124 of the second carrier 712. In this way, the surface of the guiding member 733 at the side close to the upper cover 51 may be flush with the surface of the second carrier 712 at the side close to the upper cover 51 (that is, the outer surface of the guiding member 733 may be flush with the outer surface of the protruding portions, and the limitation "be flush with" described in the present disclosure allows a certain error range). The arrangement of the guiding member 733 may not result in an increase of the thickness of the first motor in the first direction X. The upper surfaces of the first side wall 7121 and the second side wall 7122 of the second carrier 712 are exposed relative to the guiding member 733.

Figure 12:
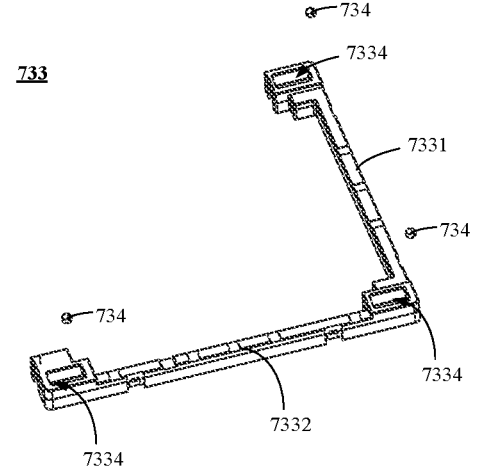
FIG. 12 is a schematic structural view of a guiding member in FIG. 5.

As shown in FIGS. 11 and 12, the guiding member 733 may define one or more guiding grooves. The one or more guiding grooves may include one or more first grooves 7333 (marked in FIG. 11) extending along the second direction Y and one or more second grooves 7334 (marked in FIG. 12) extending along the third direction Z. At least one rolling ball 734 is received in each of the one or more guiding grooves. The one or more rolling balls 734 cooperate with the guiding member 733 to enable the second carrier 712 to move along the second direction Y under the driving of the second acting force and move along the third direction Z under the driving of the third acting force.

In some embodiments, as shown in FIG. 11, the side of the guiding member 733 close to the second carrier 712 may define the one or more first grooves 7333. Each of the one or more first grooves 7333 may be extended along the second direction Y. Each of the one or more first grooves 7333 may receive one rolling ball 734 of the one or more rolling balls 734. The rolling ball 734 in each of the one or more first grooves 7333 may move along the second direction Y in the corresponding one of the one or more first grooves 7333, that is, the one or more first grooves 7333 are configured to guide the rolling structure in the second direction Y, so as to enable the second carrier 712 to move along the second direction Y relative to the inner shell 50 under the action of the second acting force. In this way, the accuracy of image stabilization in the second direction Y may be improved. In some embodiments, each of the one or more first grooves 7333 may also receive two rolling balls 734, three rolling balls 734, or more rolling balls 734, which is not limited by embodiments of the present disclosure, and those skilled in the art may choose according to actual needs.

The number of the one or more first grooves 7333 may be three. As shown in FIG. 11, the three first grooves 7333 may be respectively arranged at the joint of the first portion 7331 and the second portion 7332 of the guiding member 733, the end of the first portion 7331 away from the second portion 7332, and the end of the second portion 7332 away from the first portion 7331. As shown in FIGS. 8 and 11, the first grooves 7333 on the guiding member 733 and the first limiting grooves 7128 on the second carrier 712 may be arranged in one-to-one correspondence, and may cooperate with each other to accommodate the rolling balls 734. Each of the first grooves 7333 may face a corresponding one of the first limiting grooves 7128. The rolling balls 734 received by the first grooves 7333 on the guiding member 733 and the first limiting grooves 7128 on the second carrier 712 may be referred to as first rolling balls.

As shown in FIG. 12, the side of the guiding member 733 close to the upper cover 51 may define the one or more second grooves 7334. Each of the one or more second grooves 7334 may be extended along the third direction Z. Each of the one or more second grooves 7334 may receive one rolling ball 734 of the one or more rolling balls 734. The rolling ball 734 received in each of the one or more second grooves 7334 may move along the third direction Z in the corresponding one of the one or more second grooves 7334, that is, the one or more second grooves 7334 are configured to guide the rolling structure in the third direction Z, so as to enable the second carrier 712 to move along the third direction Z relative to the inner shell 50 under the action of the third acting force. In this way, the accuracy of image stabilization in the third direction Z may be improved. In some embodiments, each of the one or more second grooves 7334 may also receive two rolling balls 734, three rolling balls 734, or more rolling balls 734, which is not limited by embodiments of the present disclosure, and those skilled in the art may choose according to actual needs.

The number of the one or more second grooves 7334 may also be three. As shown in FIG. 12, the three second grooves 7334 may be respectively arranged at the joint of the first portion 7331 and the second portion 7332 of the guiding member 733, at the end of the first portion 7331 away from the second portion 7332, and at the end of the second portion 7332 away from the first portion 7331. As shown in FIGS. 4 and 12, the second grooves 7334 on the guiding member 733 and the second limiting grooves 512 on the upper cover 51 may be arranged in one-to-one correspondence, and may cooperate with each other to accommodate the rolling balls 734. Each of the second grooves 7334 may face a corresponding one of the second limiting grooves 512. The rolling balls 734 received by the second grooves 7334 on the guiding member 733 and the second limiting grooves 512 on the upper cover 51 may also be referred to as second rolling balls.

As shown in FIGS. 4 and 8, the third limiting groove 7129 on the second carrier 712 and the fourth limiting groove 513 on the upper cover 51 may cooperate with each other to accommodate one rolling ball 734 of the one or more rolling balls 734. The third limiting groove 7129 and the fourth limiting groove 513 are square-shaped, and the rolling ball 734 received in the third limiting groove 7129 is configured to move along the second direction Y and the third direction Z in the third limiting groove 7129. The rolling ball 734 received by the third limiting groove 7129 on the second carrier 712 and the fourth limiting groove 513 on the upper cover 51 may also be referred to as a third rolling ball.

In some embodiments, the second acting force along the second direction Y drives the second carrier 712 to move along the second direction Y relative to the inner shell 50 based on the rolling actions of the first rolling balls and the third rolling ball. The third acting force along the third direction Z drives the second carrier 712 to move along the third direction Z relative to the inner shell 50 based on the rolling actions of the second rolling balls and the third rolling ball.

The aforesaid embodiments enable the second carrier 712 to move along the second direction Y and the third direction Z relative to the inner shell 50 by using seven rolling balls 734. Each of three of the seven rolling balls 734 is received in a corresponding first groove 7333 of the three first grooves 7333, may roll along the second direction Y, and is configured to enable the second carrier 712 to move along the second direction Y relative to the inner shell 50. Each of another three of the seven rolling balls 734 is received in a corresponding second groove 7334 of the three second grooves 7334, may roll along the third direction Z, and is configured to enable the second carrier 712 to move along the third direction Z relative to the inner shell 50. The remaining one of the seven rolling balls 734 is received by the second carrier 712 and the upper cover 51 cooperatively, may roll along both the second direction Y and the third direction Z, and is configured to enable the second carrier 712 to move along both the second direction Y and the third direction Z relative to the inner shell 50. The number of the rolling balls 734 is relatively less, and the structure of the first motor is relatively simple.

In some embodiments, the guiding member 733 may also be other mechanisms. For example, the guiding member 733 may include a first portion, a second portion, a third portion, and a fourth portion connected in sequence from head to tail. That is, the guiding member 733 may be square-shaped, and sandwiched between the second carrier 712 and the upper cover 51. The guiding member 733 may also have a certain thickness in the first direction X. Four first grooves may be defined on the side surface of the guiding member 733 close to the upper cover 51, and four second grooves may be defined on the side surface of the guiding member 733 close to the second carrier 712. Each of four corners of the guiding member 733 may define a corresponding one of the four first grooves and a corresponding one of the four second grooves. Each of the four first grooves receives one rolling ball, and each of the four second grooves receives one rolling ball. The second carrier 712 moves along the second direction Y and the third direction Z relative to the inner shell 50 through eight rolling balls.

In general, in the first image-stabilization mechanism 70 of some embodiments of the present disclosure, the upper elastic sheet and the lower elastic sheet are used to assist the first carrier 711 to drive the lens 60 to move in the first direction X relative to the second carrier 712, and the structure with rolling balls are used to assist the second carrier 712 to drive the first carrier 711 and the lens 60 to move in the second direction Y and the third direction Z. In this way, the advantages of the structure with elastic sheets and the structure with rolling balls may be integrated. Not only the performance of the first motor may be improved, but also the reliability of the first motor may be ensured, thereby resulting in a technical effect of 1+1>2.

As aforementioned, in some embodiments, the structure with rolling balls may be used to realize the movement of the lens along the first direction X, the second direction Y, and the third direction Z. However, in such a scheme, the rolling balls rolling along the first direction X are prone to be impacted and form dents, resulting in an unsmooth rolling. By using an elastic structure to realize the movement of the lens along the first direction X and using the structure with rolling balls to realize the movement of the lens 60 along the second direction Y and the third direction Z, the problem of unsmooth rolling may be avoided, and the reliability is high.

In some embodiments, the elastic structure may also be used to realize the movement of the lens along the first direction X, and bail wires may be used to realize the movement of the lens along the second direction Y and the third direction Z. In some embodiments, the upper elastic sheet and the base may be square-shaped. Each corner of the upper elastic sheet and each corner of the base 52 may be connected through a bail wire. The bail wire may be made of stainless steel or other types of alloys. With the assistance of four bail wires, the second carrier 712 moves along the second direction Y and the third direction Z. However, in such a scheme, the bail wire is prone to be broken due to pulling. By using elastic structure to realize the movement of the lens along the first direction X and using the structure with rolling balls to realize the movement of the lens 60 in the second direction Y and the third direction Z, the problem that the bail wire is prone to be broken due to pulling may be avoided, and the reliability is high.

As shown in FIG. 5, the second circuit board 74 is arranged between the upper cover 51 and the coil board 731. The coil board 731 is fixed on the second circuit board 74. The second circuit board 74 and the coil board 731 may be electrically connected to each other, and the second circuit board 74 may be electrically connected to the second coil 7312 and each of the one or more third coils 7313, respectively. In some embodiments, the second circuit board 74 may also be electrically connected to each of the one or more first coils 721. The second circuit board 74 may be adhered to the upper cover 51 by using an adhesive. The coil board 731 may be adhered to the second circuit board 74 by using an adhesive.

When it is necessary to realize the focusing of the lens 60 and/or the image-stabilization compensation in the first direction X, each of the one or more first coils 721 facing the corresponding first magnet 722 may be powered through the second circuit board 74, and each of the one or more first coils 721 may cooperate with the corresponding first magnet 722 to generate the first acting force along the first direction X when being in a power-on state. The first acting force drives the first carrier 711 to move along the first direction X in the storage space 7120 of the second carrier 712. When moving, the first carrier 711 may drive the lens 60 to move along the first direction X, so as to change the distance between the lens 60 and the image sensor 40, in order to realize the focusing. In addition, when the lens 60 moves along the first direction X, the shake of the lens 60 in the first direction X may also be compensated.

When it is necessary to realize the image-stabilization compensation of the lens 60 in the second direction Y, the second coil 7312 facing the second magnet 732 may be powered through the second circuit board 74, and the second coil 7312 may cooperate with the second magnet 732 to generate the second acting force along the second direction Y when being in a power-on state. The second acting force drives the second carrier 712 to move along the second direction Y relative to the inner shell 50 based on rolling actions of the first rolling balls and the third rolling ball, and then the second carrier 712 drives the first carrier 711 and the lens 60 to move along the second direction Y to compensate the shake of the lens 60 in the second direction Y.

When it is necessary to realize the image-stabilization compensation of the lens 60 in the third direction Z, each of the two third coils 7313 facing the corresponding first magnet 722 second magnet 732 may be powered through the second circuit board 74, and each of the two third coils 7313 may cooperate with the corresponding first magnet 722 to generate the third acting force along the third direction Z when being in a power-on state. The third acting force drives the second carrier 712 to move along the third direction Z relative to the inner shell 50 based on rolling actions of the second rolling balls and the third rolling ball, and then the second carrier 712 drives the first carrier 711 and the lens 60 to move along the third direction Z to compensate the shake of the lens 60 in the third direction Z.

Figure 13:
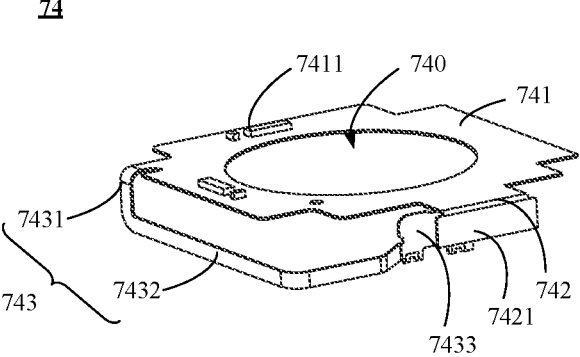
FIG. 13 is a schematic structural view of a second circuit board in FIG. 5.

As shown in FIG. 13, the second circuit board 74 may include a body portion 741, an extending portion 742 connected to the body portion 741, and a bending portion 743 connected to the body portion 741.

The body portion 741 may define a second through hole 740. The body portion 741 may be arranged between the upper cover 51 and the coil board 731, and is fixedly connected to the upper cover 51. The coil board 731 is fixed on the body portion 741. The body portion 741 may be a rigid circuit board, such a copper clad board, which is not limited by embodiments of the present disclosure, and those skilled in the art may choose according to actual needs.

As shown in FIG. 13, the body portion 741 may be provided with a first sensing member 7411. The first sensing member 7411 may be configured to cooperate with the one or more first magnets 722 or the second magnet 732 arranged on the second carrier 712 to detect a position of the second carrier 712. In this way, each displacement of the second carrier 712 may be accurate.

As shown in FIG. 13, the extending portion 742 may be a flexible circuit board. For example, the base material of the extending portion 742 may include polyester film or polyimide, which is not limited by embodiments of the present disclosure, and those skilled in the art may choose according to actual needs. The extending portion 742 may be arranged with a pin 7421, and the extending portion 742 may be extended out of the accommodating space 501 to be electrically connected to the first circuit board 30.

As shown in FIG. 13, the bending portion 743 may be a flexible circuit board. For example, the base material of the bending portion 743 may include polyester film or polyimide, which is not limited by embodiments of the present disclosure, and those skilled in the art may choose according to actual needs. The bending portion 743 includes a first sub-portion 7431 and a second sub-portion 7432. The first sub-portion 7431 and the second sub-portion 7432 may be integrally formed. The second sub-portion 7432 may be extended around the outer surfaces of the second carrier 712 and connected to the outer surfaces of the second carrier 712. The body portion 741 and the second sub-portion 7432 may be connected through the first sub-portion 7431. When the second carrier 712 moves relative to the upper cover 51, the bending portion 743 may generate an opposite pulling force on the second carrier 712 to improve the reliability of the camera module 100.

In some embodiments, the second sub-portion 7432 may be provided with a second sensing member 7433. The first carrier 711 may be provided with a third magnet (which is not shown in the figures), and the second sensing member 7433 may be configured to cooperate with the third magnet to detect a position of the first carrier 711. In this way, each displacement of the first carrier 711 may be accurate.

The second image-stabilization mechanism 80 may be configured to drive the image sensor 40 to rotate around the first direction X, move along the second direction Y, and move along the third direction Z. It should be noted that, in some embodiments of the present disclosure, the description that the second image-stabilization mechanism 80 drives the image sensor 40 to rotate around the first direction X, move along the second direction Y, and move along the third direction Z, indicates that the second image-stabilization mechanism 80 may drive the image sensor 40 to rotate around the first direction X, may drive the image sensor 40 to move along the second direction Y, and may drive the image sensor 40 to move along the third direction Z, but does not indicate that the image sensor 40 rotates around the first direction X, moves along the second direction Y, and moves along the third direction Z simultaneously. For example, in some embodiments of the present disclosure, the description that the second image-stabilization mechanism 80 drives the image sensor 40 to rotate around the first direction X, move along the second direction Y, and move along the third direction Z, may indicate that the image sensor 40 is driven to rotate around the first direction X, or the image sensor 40 is driven to move along the second direction Y, or the image sensor 40 is driven to move along the third direction Z, or the image sensor 40 is driven to move around the first direction X and move along the second direction Y simultaneously, or the image sensor 40 is driven to rotate around the first direction X and move along the third direction Z simultaneously, or the image sensor 40 is driven to move along the second direction Y and the third direction Z simultaneously, or the image sensor 40 is driven to rotate around the first direction X, move along the second direction Y, and move along the third direction Z simultaneously.

As aforementioned, in some embodiments of the present disclosure, the first image-stabilization mechanism 70 drives the lens 60 to move along the first direction X, so as to enable the camera module 100 to achieve the function of autofocus photography. The first image-stabilization mechanism 70 drives the lens 60 to move along the second direction Y and the third direction Z, the second image-stabilization mechanism 80 drives the image sensor 40 to rotate around the first direction X, move along the second direction Y, and move along the third direction Z, so as to enable the camera module 100 to achieve a great image-stabilization angle in various directions.

Figure 14:
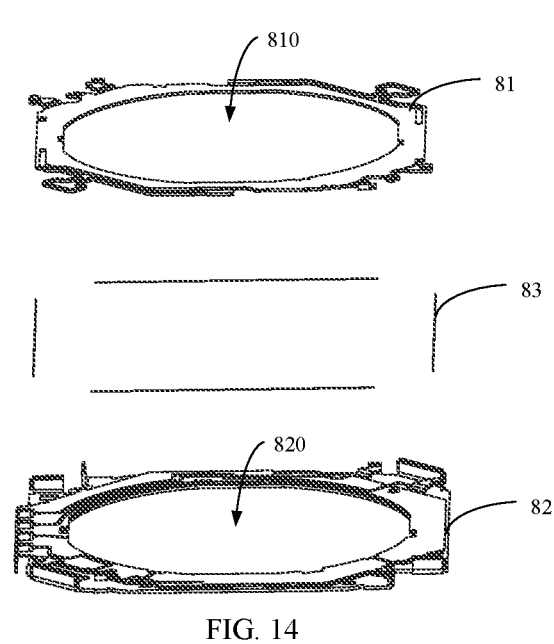
FIG. 14 is a schematic perspective exploded view of a second image-stabilization mechanism in FIG. 2.

Next, the structure of the second image-stabilization mechanism 80 will be described. As shown in FIGS. 2 and 14, the second image-stabilization mechanism 80 may include a fixing member 81, a movable member 82, and one or more deformation members. In some embodiments, the fixing member 81 and the one or more deformation members may also be referred to as a third drive assembly.

The fixing member 81 is connected to the inner shell 50. In some embodiments, the fixing member 81 may be fixed on a side of the base 52 close to the first circuit board 30. In some embodiments, each of the one or more deformation members may be a memory-alloy wire 83. The movable member 82 and the fixing member 81 may be connected through the memory-alloy wire 83. The movable member 82 is connected to the first circuit board 30. The memory-alloy wire 83 may be deformable, such as being elongated or shortened, in response to a temperature change when being in a power-on state. In this way, the movable member 82 is driven to enable or drive the first circuit board 30 to rotate around the first direction X, move along the second direction Y, and move along the third direction Z relative to the inner shell 50. Then the first circuit board 30 drives the image sensor 40 to rotate around the first direction X, move along the second direction Y, and move along the third direction Z relative to the inner shell 50, so as to realize the optical image-stabilization function of the image sensor 40.

In some embodiments, the movable member 82 may be directly connected to the image sensor 40. The movable member 82 may directly drives the image sensor 40 to move relative to the fixing member 81 and the base 52, which is not limited by embodiments of the present disclosure, and those skilled in the art may choose according to actual needs.

Figure 15:
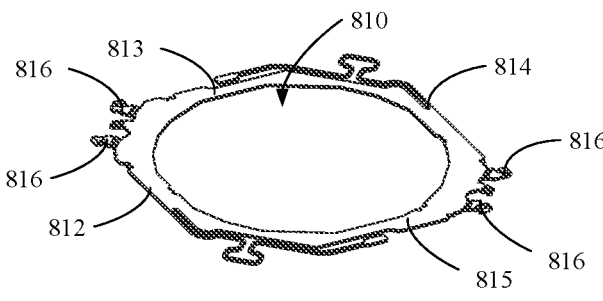
FIG. 15 is a schematic structural view of a fixing member in FIG. 14.

As shown in FIG. 15, the fixing member 81 may be elastic, and the material of the fixing member 81 may be the same as or similar to each of the two elastic sheets 723. For example, the fixing member 81 may be a metal sheet, a spring sheet, or other elastic connecting members. The fixing member 81 and the base 52 of the inner shell 50 may be connected through an engaging structure. The fixing member 81 may include a first elastic arm 812, a second elastic arm 813, a third elastic arm 814, and a fourth elastic arm 815 connected in sequence from head and tail. The first elastic arm 812, the second elastic arm 813, the third elastic arm 814, and the fourth elastic arm 815 cooperatively form a fifth through hole 810. Each elastic arm is provided with a first fixing claw 816. The first fixing claw 816 on the first elastic arm 812 and the first fixing claw 816 on the second elastic arm 813 may be adjacent to each other. The first fixing claw 816 on the third elastic arm 814 and the first fixing claw 816 on the fourth elastic arm 815 may be adjacent to each other.

As shown in FIGS. 14 and 15, the second image-stabilization mechanism 80 may include four memory-alloy wires 83. The four memory-alloy wires 83 are distributed along the peripheral direction of the fixing member 81. The four memory-alloy wires 83 may be recorded as a first memory-alloy wire 831, a second memory-alloy wire 832, a third memory-alloy wire 833, and a fourth memory-alloy wire 834, respectively. The first elastic arm 812 faces the first memory-alloy wire 831, the second elastic arm 813 faces the second memory-alloy wire 832, the third elastic arm 814 faces the third memory-alloy wire 833, and the fourth elastic arm 815 faces the fourth memory-alloy wire 834. The first fixing claw 816 on each elastic arm is configured to fix one end of a corresponding one of the four memory-alloy wires 83.

The movable member 82 may be attached to or adhered to the first circuit board 30. A sixth through hole 820 may be defined on the movable member 82. As shown in FIGS. 5 and 14, light may enter the image sensor 40 through the first through hole 510 on the upper cover 51, the second through hole 740 on the second circuit board 74, the third through hole 7330 on the coil board 733, the fourth through hole 520 on the base 52, the fifth through hole 810 on the fixing member 81, and the sixth through hole 820 on the movable member 82 in sequence.

Figure 16:
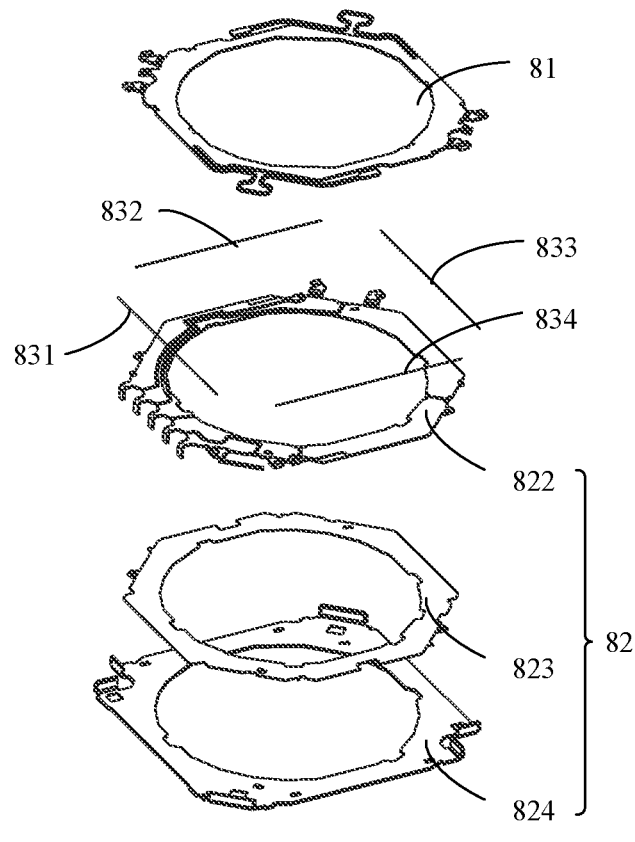
FIG. 16 is a schematic perspective exploded view of a second image-stabilization mechanism in FIG. 2.

As shown in FIG. 16, the movable member 82 may include a third circuit board 822 connected to the memory-alloy wires 83, an insulating board 823, and a support board 824. The insulating board 823 is arranged between the third circuit board 822 and the support board 824. In some embodiments, the support board 824 of the movable member 82 may be adhered to the first circuit board 30 via an adhesive.

Figure 17:
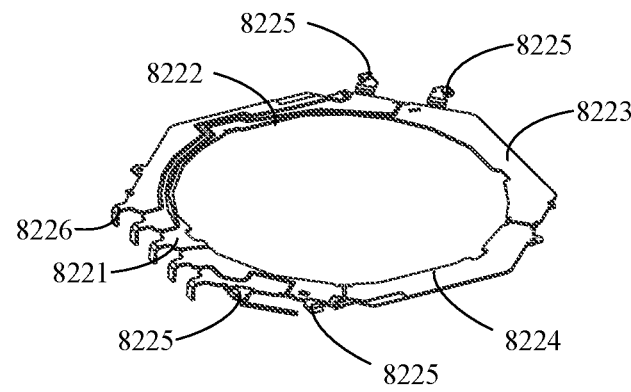
FIG. 17 is a schematic structural view of a third circuit board in FIG. 16.

As shown in FIG. 17, the third circuit board 822 may include a first portion 8221, a second portion 8222, a third portion 8223, and a fourth portion 8224 connected in sequence from head to tail. The first portion 8221 of the third circuit board 822 may face the first elastic arm 812 of the fixing member 81. The second portion 8222 of the third circuit board 822 may face the second elastic arm 813 of the fixing member 81. The third portion 8223 of the third circuit board 822 may face the third elastic arm 814 of the fixing member 81. The fourth portion 8224 of the third circuit board 822 may face the fourth elastic arm 815 of the fixing member 81.

As shown in FIGS. 16 and 17, each of the first portion 8221, the second portion 8222, the third portion 8223, and the fourth portion 8224 of the third circuit board 822 may have a second fixing claw 8225, and the second fixing claw 8225 may be configured to fix the other end of a corresponding memory-alloy wire 83 of the four memory-alloy wires 83. The second fixing claw 8225 on the second portion 8222 and the second fixing claw 8225 on the third portion 8223 may be adjacent to each other. The second fixing claw 8225 on the first portion 8221 and the second fixing claw 8225 on the fourth portion 8224 may be adjacent to each other. In this way, one end of each of the four memory-alloy wires 83 is connected to the first fixing claw 816 on the fixing member 81, and the other end of each of the four memory-alloy wires 83 is connected to the second fixing claw 8225 on the third circuit board 822. The third circuit board 822 may be connected to an external power-supply apparatus to power the memory-alloy wires 83.

The four memory-alloy wires 83 work together to drive the movable member 82 to rotate around the first direction X, move along the second direction Y, and move along third direction Z relative to the inner shell 50, so as to achieve the optical image-stabilization function of the image sensor 40. It may be understood that the aforesaid description is only some embodiments of the present disclosure and cannot be understood as restrictions on the embodiments of the present disclosure. The number of the memory-alloy wires 83 may also be two, three, five, or more.

For example, by powering the first memory-alloy wire 831 and the third memory-alloy wire 833, the length of the first memory-alloy wire 831 and the length of the third memory-alloy wire 833 may be changed, and the movable member 82 connected to the first memory-alloy wire 831 and the third memory-alloy wire 833 may be enabled to move along the second direction Y. By powering the second memory-alloy wire 832 and the fourth memory-alloy wire 834, the length of the second memory-alloy wire 832 and the length of the fourth memory-alloy wire 834 may be changed, and the movable member 82 connected to the second memory-alloy wire 832 and the fourth memory-alloy wire 834 may be enabled to move along the third direction Z. The first memory-alloy wire 831 and the second memory-alloy wire 832 may be powered simultaneously, so as to enable the movable member 82 connected to the first memory-alloy wire 831 and the second memory-alloy wire 832 to rotate around the first direction X. The first memory-alloy wire 831 and the fourth memory-alloy wire 834 may be powered simultaneously, so as to enable the movable member 82 connected to the first memory-alloy wire 831 and the fourth memory-alloy wire 834 to rotate around the first direction X. The rotation around the first direction X may be in a clockwise direction or an anticlockwise direction. It may be understood that, the first memory-alloy wire 831, the second memory-alloy wire 832, the third memory-alloy wire 833, and the fourth memory-alloy wire 834 may be powered with different currents simultaneously, so as to control the length of deformation of each of the memory-alloy wires 83. In this way, the movable member 82 may be enabled to rotate around the first direction X, move along the second direction Y, and move along the third direction Z relative to the inner shell 50 simultaneously. Then the movable member 82 may drive the image sensor 40 to rotate around the first direction X, move along the second direction Y, and move along the third direction Z simultaneously.

As shown in FIG. 17, a side of the third circuit board 822 may be provided with a pin 8226 configured for electrically connection with the first circuit board 30. As shown in FIG. 18, the pin 8226 of the third circuit board 822 may be led out through the avoidance structure 522 defined on the base 52. The structure of the base 52 is complex due to the avoidance structure 522. If the coil board 731 and the second circuit board 74 of the first image-stabilization mechanism 70 are also arranged on the base 52, the difficulty of assembly may be increased. The coil board 731 and the second circuit board 74 are prone to interfere with the second image-stabilization mechanism 80, and the reliability of the camera module 100 may be reduced. In some embodiments of the present disclosure, the coil board 731 is fixed on the upper cover 51, and the aforesaid problems may be avoided.

As shown in FIGS. 1 and 18, the first circuit board 30 is provided with three third sensing members (which are not shown in the figures). The third sensing members may be arranged on the side of the first circuit board 30 close to the base 52. Each of the third sensing members may face a fourth magnet 523 arranged on the base 52 to detect the positions of the first circuit board 30 and the image sensor 40. In this way, the displacement of the image sensor 40 may be accurate. The embodiments of the present disclosure do not limit the number of the third sensing members, in some embodiments, the number of the third sensing members may also be four, the number of the fourth magnet 523 may also be four, and each corner of the base 52 may be provided with a fourth magnet 523, those skilled in the art may choose according to actual needs.

As shown in FIG. 1, the light-filtering assembly 90 may be arranged between the image sensor 40 and the second image-stabilization mechanism 80. The light-filtering assembly 90 includes a bracket 91 and an infrared filter 92 arranged on the bracket 91. On one hand, the bracket 91 may support the infrared filter 92; on the other hand, the bracket 91 may form an enclosed space with the first circuit board 30, and the image sensor 40 may be received in the enclosed space to protect the image sensor 40.

Figure 19:
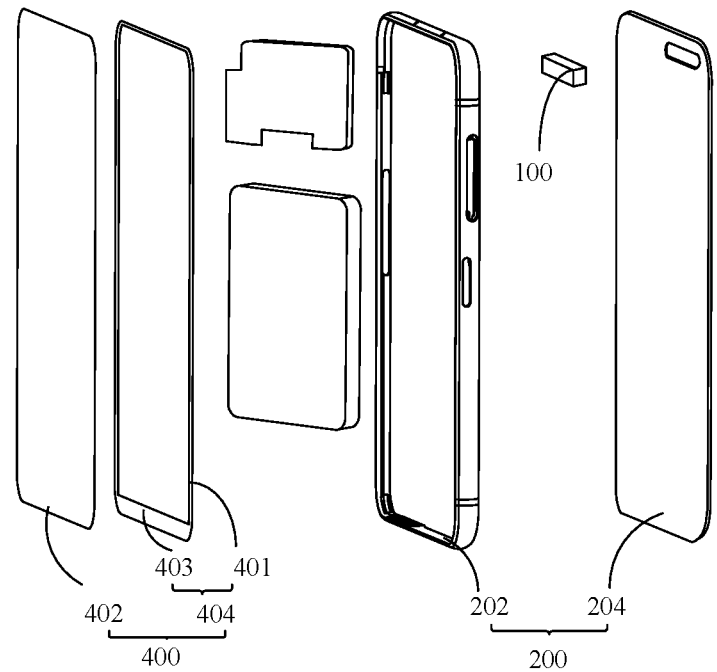
FIG. 19 is a schematic structural view of an electronic device according to some embodiments of the present disclosure.

Some embodiments of the present disclosure provide an electronic device. As shown in FIGS. 19 and 20, the electronic device 1000 may include a housing 200, a display assembly 400, and the camera module 100 described above. The display assembly 400 and the camera module 100 are both arranged on the housing 200. In some embodiments of the present disclosure, mobile phones are described as an example of the electronic device. It may be understood that the electronic device may also be tablet computers, laptops, smart watches, etc., which is not limited in the present disclosure.

The "electronic device" described in the embodiments of the present disclosure includes, but is not limited to, devices connected to a wired line (such as a Public Switched Telephone Network (PSTN), a Digital Subscriber Line (DSL), a digital cable, a direct cable, and/or other data connections/networks) and/or wireless signals (such as a Cellular Network, a Wireless Local Area Network (WLAN), a digital television network such as a Digital Video Broadcasting Handheld (DVB-H) network, a satellite network, a AM-FM broadcast transmitter, and/or the other communication terminals), such as smart phones, tablets, laptops, wearable devices, etc. The "electronic device" described in the embodiments of the present disclosure may also be referred to as "mobile terminal" or "electronic apparatus", etc.

As shown in FIG. 21, the housing 200 is a shell of the mobile phone, and may protect internal members (such as the main board, battery, and so on) thereof. In some embodiments, the housing 200 may include a front housing 202 and a rear cover 204 connected to the front housing 202. The front housing 202 is connected to the rear cover 204 to form an accommodation space 206 for accommodating the internal members of the mobile phone.

The rear cover 204 may be in a shape of a rectangle or a rounded rectangle, and may include plastics, glasses, ceramics, fiber composites, metals (such as stainless steel, aluminum, etc.), or other suitable materials, or combinations of these materials. In some embodiments, a part of the rear cover 204 may be made of dielectric materials or other low conductivity materials. In some embodiments, the rear cover 204 or at least some structures constituting the rear cover 204 may be made of metal members. The front housing 202 may be extended vertically from four edges of the rear cover 204, and may be formed by four edge frames connected from head to tail.

The display assembly 400 may be electrically connected to the camera module 100, the battery, the processor, etc., and configured to display information. As shown in FIG. 19, the display assembly 400 may include a cover plate 402 and a display screen 404.

The display screen 404 is embedded in the front housing 202, and the cover plate 402 is covered on the display screen 404 to protect the display screen 404. The cover plate 402 may include or be made of glasses, plastics, or other materials with good light transparency. The display screen 404 may include a display region 401 and a non-display region 403. The non-display region 403 may be located on a side of the display region 401 or may surround the periphery of the display region 401.

As shown in FIGS. 19 and 20, the rear cover 204 may define a through hole 2041. The camera module 100 faces the through hole 2041 on the rear cover 204, and collects light through the through hole 2041 on the rear cover 204. As shown in FIG. 20, the through hole 2041 may be arranged at the upper left of the rear cover 204. In some embodiments, the through hole 2041 may also be defined at the upper middle of the rear cover 204, upper right of the rear cover 204, or other positions according to needs, which is not limited herein.

It may be understood that, the display screen 404 may also define a through hole 4041. As shown in FIG. 22, FIG. 22 is a schematic front structural view of an electronic device 1000 according to some embodiments of the present disclosure. The camera module 100 may face the through hole 4041 on the display screen 404, and collect light through the through hole 4041 on the display screen 404. As shown in FIG. 20, the through hole 4041 may be defined at the upper left of the display screen 404. In some embodiments, the through hole 4041 may also be defined at the upper middle of the display screen 404, upper right of the display screen 404, or other positions according to needs, which is not limited herein.

It may be understood that, the embodiments shown in FIGS. 19 to 22 are only some embodiments of the present disclosure and cannot be understood as restrictions on the embodiments of the present disclosure. For example, the rear cover 204 may define a plurality of through holes, and each of the plurality of through holes may faces at least one camera module. In the description of the embodiments of the present disclosure, "a plurality of" means at least two, such as two, three, etc., unless otherwise specifically defined.

In some embodiments, as shown in FIG. 23, the rear cover 204 may define a first opening 2041a, a second opening 2041b, and a third opening 2041c. The electronic device 1000 may include three camera modules. The three camera modules may be respectively recorded as a first camera module, a second camera module, and a third camera module. The first camera module may face the first opening 2041a. The second camera module may face the second opening 2041b. The third camera module may face the third opening 2041c. At least one of the first camera module, the second camera module, and the third camera module may be the camera module 100 described above. For example, the first camera module may be the camera module 100 described above, which is not limited by embodiments of the present disclosure, and those skilled in the art may choose according to actual needs.

As shown in FIG. 23, connecting lines of center points of the first opening 2041a, the second opening 2041b, and the third opening 2041c may be located on a straight line. In some embodiments, the first opening 2041a, the second opening 2041b, and the third opening 2041c may be arranged along a vertical direction of the mobile phone. In some embodiments, as shown in FIG. 24, the first opening 2041a, the second opening 2041b, and the third opening 2041c may also arranged in a horizontal direction of the mobile phone as required. In some embodiments, as shown in FIG. 25, connecting lines of center points of the first opening 2041a, the second opening 2041b, and the third opening 2041c may also cooperatively form a triangle.

The above is only some embodiments of the present disclosure, which does not limit the patent scope of the present disclosure. Any equivalent structure transformations or equivalent process transformations made by using the contents of the description and figures of the present disclosure, or direct or indirect applications in other related technical fields, are similarly included in the patent protecting scope of the present disclosure.

What is claimed is:

1. A motor for a camera module, comprising:
an upper cover;
a base, cooperatively forming an accommodating space with the upper cover;
a carrying assembly, arranged in the accommodating space, and configured to carry a lens of the camera module;
one or more first coils, arranged in the accommodating space, and fixedly connected to the upper cover; and
one or more magnets, arranged on the carrying assembly, and configured to cooperate with the one or more first coils to drive the carrying assembly to move relative to the upper cover, wherein the carrying assembly is enabled to drive the lens to move;
the carrying assembly comprises a first carrier and a second carrier, the first carrier defines a through hole an inner wall of the through hole is connected to the lens, and the second carrier surrounds the first carrier and is connected to the first carrier; and
the one or more magnets are arranged on the second carrier the one or more magnets are configured to cooperate with the one or more first coils to drive the second carrier to move relative to the upper cover and the second carrier is enabled to drive the first carrier and the lens to move.

2. The motor according to claim 1, wherein
the one or more magnets comprise a first magnet and a second magnet, the second carrier comprises a first side wall and a second side wall adjacent to each other, each of the first side wall and the second side wall defines an installation groove, the first magnet is received in the installation groove on the first side wall, and the second magnet is received in the installation groove on the second side wall.

3. The motor according to claim 2, wherein
the one or more first coils comprise at least two first coils;
the first magnet faces a first coil of the at least two first coils, and is configured to cooperate with the first coil to drive the second carrier to move along a first direction, and the first direction is perpendicular to an optical-axis direction of the lens;
the second magnet faces another first coil of the at least two first coils, and is configured to cooperate with the another first coil to drive the second carrier to move along a second direction, and the second direction is perpendicular to the optical-axis direction of the lens and perpendicular to the first direction.

4. The motor according to claim 3, wherein
a projection of each of the at least two first coils on a plane perpendicular to a third direction is in shape of a ring, a projection of each of the at least two first coils on a plane parallel to the third direction is in shape of a strip, and the third direction is parallel to the optical-axis direction of the lens;
the first magnet comprises a first portion and a second portion arranged along the third direction, and a polarity arrangement direction of magnetic poles of the first portion of the first magnet is opposite to a polarity arrangement direction of magnetic poles of the second portion of the first magnet; and the second magnet comprises a first portion and a second portion, a polarity arrangement direction of magnetic poles of the first portion of the second magnet is opposite to a polarity arrangement direction of magnetic poles of the second portion of the second magnet, projections of the first portion of the second magnet and the second portion of the second magnet on the plane perpendicular to the third direction are arranged side by side, and projections of the first portion of the second magnet and the second portion of the second magnet on the plane parallel to the third direction are completely overlapped.

5. The motor according to claim 3, wherein the motor further comprises:

a guiding member, arranged between the second carrier and the upper cover, and defining one or more guiding grooves; and one or more rolling balls, received in the one or more guiding grooves, and configured to cooperate with the guiding member to enable the second carrier to move along the first direction and the second direction.

6. The motor according to claim 5, wherein the one or more guiding grooves comprise a first groove and a second groove, and each of the first groove and the second groove is configured to receive one rolling ball of the one or more rolling balls;

the first groove is arranged on one side of the guiding member close to the second carrier and extended along one of the first direction and the second direction, and the one rolling ball received in the first groove is enabled to move along the one of the first direction and the second direction in the first groove; and the second groove is arranged on the other side of the guiding member close to the upper cover and extended along the other of the first direction and the second direction, and the one rolling ball received in the second groove is enabled to move along the other of the first direction and the second direction in the second groove.

7. The motor according to claim 6, wherein a sinking groove and a protruding portion adjacent to the sinking groove are arranged on the second carrier, the guiding member is received in the sinking groove, and a surface of the protruding portion close to the upper cover is flush with a surface of the guiding member close to the upper cover.

8. The motor according to claim 7, wherein a bottom of the sinking groove defines a first limiting groove, and the first limiting groove is configured to cooperate with the first groove to receive the one rolling ball;

the upper cover defines a second limiting groove, and the second limiting groove is configured to cooperate with the second groove to receive the one rolling ball; and the protruding portion defines a third limiting groove, the upper cover further defines a fourth limiting groove, the fourth limiting groove is configured to cooperate with the third limiting groove to receive another rolling ball of the one or more rolling balls, and the another rolling ball received in the third limiting groove is configured to move along the first direction and the second direction in the third limiting groove.

9. The motor according to claim 3, wherein the motor further comprises a second coil arranged on the first carrier, the second coil is configured to cooperate with the first magnet to drive the first carrier to move along a third direction relative to the second carrier, and the first carrier is enabled to drive the lens to move along the third direction, and the third direction is parallel to the optical-axis direction of the lens.

10. The motor according to claim 9, wherein a projection of the second coil on a plane parallel to the third direction is in shape of a ring, and a projection of the second coil on a plane perpendicular to the third direction is in shape of a strip; and the first magnet comprises a first portion and a second portion arranged along the third direction, and a polarity arrangement direction of magnetic poles of the first portion of the first magnet is opposite to a polarity arrangement direction of magnetic poles of the second portion of the first magnet.

11. The motor according to claim 9, wherein the motor further comprises two elastic sheets, one of the two elastic sheets is arranged on one side of the first carrier close to the upper cover, and the other of the two elastic sheets is arranged on the other side of the first carrier close to the base, a part of each of the two elastic sheets is connected to the first carrier, and the other part of the each of the two elastic sheets is connected to the second carrier.

12. The motor according to claim 1, wherein the motor further comprises a circuit board arranged between the carrying assembly and the upper cover, and the circuit board is fixedly connected to the upper cover.

13. The motor according to claim 12, wherein the motor further comprises a coil board, the one or more first coils are arranged on the coil board, and the coil board is arranged between the carrying assembly and the circuit board, and is fixedly connected to the circuit board.

14. The motor according to claim 13, wherein the circuit board comprises:

a body portion, arranged between the second carrier and the upper cover, and fixedly connected to the upper cover, wherein the coil board is fixed on the body portion;

an extending portion, connected to the body portion, and extended out of the accommodating space to connect to a module circuit board of the camera module;

a bending portion, wherein one end of the bending portion is connected to the body portion, the other end of the bending portion is connected to the second carrier, and the bending portion is configured to generate an opposite pulling force on the second carrier in response to the second carrier moving relative to the upper cover.

15. The motor according to claim 14, wherein the bending portion comprises a first sub-portion and a second sub-portion, the second sub-portion is extended around outer surfaces of the second carrier and connected to the outer surfaces of the second carrier, and the body portion and the second sub-portion are connected by the first sub-portion.

16. The motor according to claim 1, wherein the one or more first coils are arranged between the upper cover and the carrying assembly.

17. A camera module, comprising:

a baseplate;

an outer shell, cooperatively forming a receiving chamber with the baseplate;

a module circuit board, arranged in the receiving chamber, and located on the baseplate;

an image sensor, arranged in the receiving chamber, and fixed on the module circuit board;

a lens, arranged on a side of the image sensor away from the module circuit board, wherein the image sensor is configured to convert an optical signal collected by the lens into an electrical signal;

a first motor, arranged in the receiving chamber, located on the side of the image sensor away from the module circuit board, and comprising:

an upper cover;

a base, cooperatively forming an accommodating space with the upper cover;

a carrying assembly, arranged in the accommodating space, and configured to carry the lens;

one or more first coils, arranged in the accommodating space, and fixedly connected to the upper cover; and one or more magnets, arranged on the carrying assembly, and configured to cooperate with the one or more first coils to drive the carrying assembly to move relative to the upper cover, wherein the carrying assembly is enabled to drive the lens to move; and a second motor, arranged between the first motor and the image sensor, connected to the base of the first motor, and configured to drive the image sensor to move.

18. The camera module according to claim 17, wherein the second motor comprises:

a fixing member, connected to the base of the first motor; and a movable member, connected to the fixing member and the image sensor, and configured to drive the image sensor to move relative to the fixing member.

19. The camera module according to claim 18, wherein the movable member and the fixing member are connected through one or more memory-alloy wires, the movable member is connected to one end of each of the one or more memory-alloy wires, the fixing member is connected to the other end of the each of the one or more memory-alloy wires, and the one or more memory-alloy wires are extendable and shrinkable to enable the movable member to drive the first circuit board to move relative to the fixing member.

20. An electronic device, comprising:

a housing;

a display screen, cooperatively forming an accommodation space with the housing;

a front camera, arranged in the accommodation space; and a rear camera, arranged in the accommodation space;

wherein the front camera or the rear camera comprises:

a baseplate;

an outer shell, cooperatively forming a receiving chamber with the baseplate;

a module circuit board, arranged in the receiving chamber, and located on the baseplate;

an image sensor, arranged in the receiving chamber, and fixed on the module circuit board;

a lens, arranged on a side of the image sensor away from the module circuit board, wherein the image sensor is configured to convert an optical signal collected by the lens into an electrical signal;

a first motor, arranged in the receiving chamber, located on the side of the image sensor away from the module circuit board, and comprising:

an upper cover;

a base, cooperatively forming an accommodating space with the upper cover;

a carrying assembly, arranged in the accommodating space, and configured to carry the lens;

one or more first coils, arranged in the accommodating space, and fixedly connected to the upper cover; and one or more magnets, arranged on the carrying assembly, and configured to cooperate with the one or more first coils to drive the carrying assembly to move relative to the upper cover, wherein the carrying assembly is enabled to drive the lens to move; and a second motor, arranged between the first motor and the image sensor, connected to the base of the first motor, and configured to drive the image sensor to move.

* * * * *